US011961537B2

(12) United States Patent
Zhang

(10) Patent No.: US 11,961,537 B2
(45) Date of Patent: Apr. 16, 2024

(54) CONTENT CREATION BASED ON RHYTHM

(71) Applicant: LEMON INC., Grand Cayman (KY)

(72) Inventor: Runze Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 53 days.

(21) Appl. No.: 17/246,176

(22) Filed: Apr. 30, 2021

(65) Prior Publication Data

US 2022/0351752 A1 Nov. 3, 2022

(51) Int. Cl.
*G06T 7/00* (2017.01)
*G06T 7/11* (2017.01)
(Continued)

(52) U.S. Cl.
CPC .............. *G11B 27/036* (2013.01); *G06T 7/11* (2017.01); *G06T 7/30* (2017.01); *G06T 7/70* (2017.01);
(Continued)

(58) Field of Classification Search
CPC . G06T 13/205; G06T 13/40; G10H 2210/076; G10H 2220/005;
(Continued)

(56) References Cited

U.S. PATENT DOCUMENTS 6,898,759 B1* 5/2005 Terada .................... G10H 1/368
345/473
8,317,614 B2* 11/2012 McCauley ............... G10H 1/32
84/645
(Continued)

FOREIGN PATENT DOCUMENTS

CN 107968921 A 4/2018
CN 109068081 A 12/2018
(Continued)

OTHER PUBLICATIONS

Ob-orm Muangmoon, Pradorn Sureephong, and Karim Tabia, Dance Training Tool Using Kinect-Based Skeleton Tracking and Evaluating Dancer's Performance, IEA/AIE 2017, Part II, LNAI 10351, pp. 27-32, 2017. DOI: 10.1007/978-3-319-60045-1_4 (Year: 2017).*
(Continued)

*Primary Examiner* — Weiming He
(74) *Attorney, Agent, or Firm* — BakerHostetler

(57) ABSTRACT

The present disclosure describes techniques for generating content based on rhythm. The techniques comprises acquiring a plurality of images comprising an object with movements in the plurality of images; determining whether at least one portion of the at least one part of the object in a first image aligns with a target image overlaid on the first image and whether the at least one portion aligns with the target image at a time proximate to a first rhythmic point of a playback of a selected piece of music; segmenting the at least one part of the object from the first image in response to determining that the at least one portion aligns with the target image at the time proximate to the first rhythmic point of the playback of the selected piece of music; and generating a first overlay based on the at least one part of the object.

16 Claims, 12 Drawing Sheets

(51) Int. Cl.
*G06T 7/30* (2017.01)
*G06T 7/70* (2017.01)
*G06T 13/20* (2011.01)
*G06T 13/80* (2011.01)
*G11B 27/036* (2006.01)
*G11B 27/10* (2006.01)

(52) U.S. Cl.
CPC ............ *G06T 13/205* (2013.01); *G06T 13/80* (2013.01); *G11B 27/10* (2013.01)

(58) Field of Classification Search
CPC .. G10H 2250/311; G10H 1/368; G06V 40/23; G06V 40/20; G10L 2021/105; G06F 3/011
See application file for complete search history.

(56) References Cited

U.S. PATENT DOCUMENTS

| | | | | |
|---|---|---|---|---|
| 8,591,332 | B1* | 11/2013 | Bright | A63F 13/49 |
| | | | | 463/31 |
| 8,629,342 | B2* | 1/2014 | Lee | G10H 3/186 |
| | | | | 84/610 |
| 9,033,795 | B2* | 5/2015 | Yum | A63F 13/814 |
| | | | | 463/31 |
| 9,569,895 | B2* | 2/2017 | Suzuki | G06T 11/00 |
| 9,751,019 | B2* | 9/2017 | Jackson | A63F 13/52 |
| 9,808,724 | B2* | 11/2017 | Bala | A63F 13/23 |
| 10,770,092 | B1* | 9/2020 | Adams | G10L 21/10 |
| 11,344,808 | B2* | 5/2022 | Estanislao | A63F 13/35 |
| 2007/0256540 | A1* | 11/2007 | Salter | G09B 15/06 |
| | | | | 84/485 R |
| 2010/0137048 | A1* | 6/2010 | Kim | G10H 1/0016 |
| | | | | 463/7 |
| 2011/0137753 | A1* | 6/2011 | Moehrle | H04N 21/47815 |
| | | | | 725/60 |
| 2011/0319160 | A1* | 12/2011 | Arn | G10H 1/368 |
| | | | | 463/30 |
| 2012/0071238 | A1* | 3/2012 | Bala | G10H 1/363 |
| | | | | 463/31 |
| 2016/0123758 | A1* | 5/2016 | Benzaia | G06F 3/012 |
| | | | | 701/538 |
| 2018/0071636 | A1* | 3/2018 | Bala | A63F 13/54 |
| 2018/0214777 | A1* | 8/2018 | Hingorani | A63F 13/5255 |
| 2020/0278993 | A1* | 9/2020 | Marino | H04N 21/4307 |
| 2020/0406144 | A1* | 12/2020 | Estanislao | A63F 13/67 |
| 2021/0029305 | A1 | 1/2021 | Tang et al. | |
| 2021/0383115 | A1* | 12/2021 | Alon | A63F 13/77 |

FOREIGN PATENT DOCUMENTS

| | | |
|---|---|---|
| CN | 112468741 A | 3/2021 |
| KR | 20150082093 A * | 12/2014 |

OTHER PUBLICATIONS

International Patent Application No. PCT/SG2022/050198; Int'l Search Report; dated Jul. 4, 2022; 5 pages.
"Shakira does the Emoji Challenge. The video is a must-watch"; https://www.hindustantimes.com/it-s-viral/shakira-does-the-emoji-challenge-the-video-is-a-must-watch/story-WbD2zPQ3tithVb3AGgfjiJ. html; Hindustan Times; Oct. 9, 2022; accessed Jul. 7, 2022; 12 pages.
Filiz Mustafa; "Tiktok Hand Emoji Challenge: How To Do the Latest Viral Trend"; https://web.archive.org/web/20200404212640/ https://www.hitc.com/en-GB/2020/03/23/tiktok-hand-emoji-challenge-how-to-do-the-latest-viral-trend/; GRV Media Ltd.; © 2022; 12 pages.
"How to take a photo of Douyin imitating emoji"; https://jingyan. baidu.com/article/ceb9fb10ed7ff0cdac2ba05f.html; Baidu; Aug. 2020; 10 pages.

* cited by examiner

CONTENT CREATION BASED ON RHYTHM

BACKGROUND

Communication is increasingly being conducted using Internet-based tools. The Internet-based tools may be any software or platform. Existing social media platforms, such as YouTube and Facebook, enable users to communicate with each other by sharing images, videos, and other information via static app or web pages. As communication devices, such as mobile phones, become more sophisticated, people continue to desire new ways for entertainment, social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
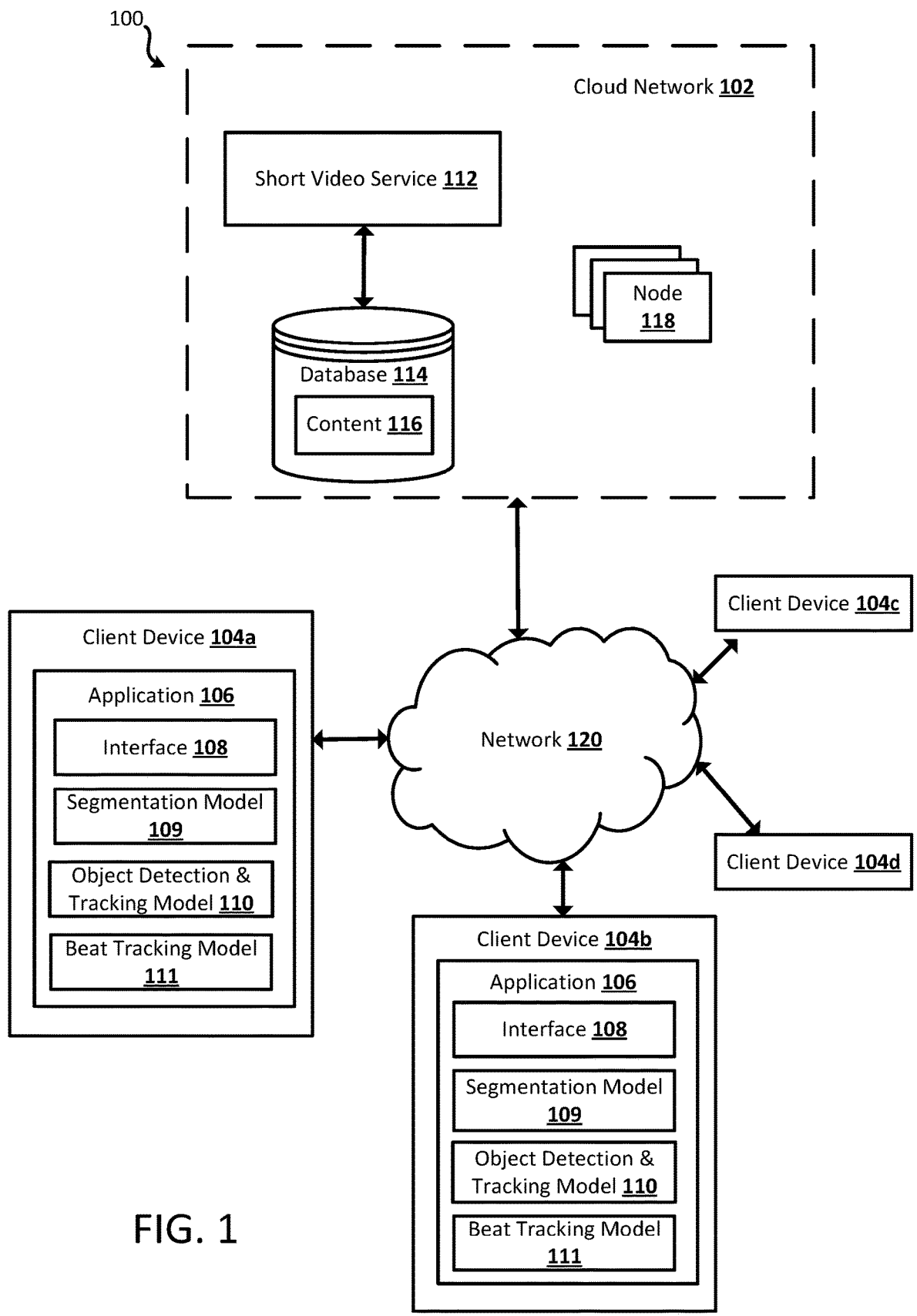
FIG. 1 shows an example system for distributing content.

FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a short video service 112. The short video service 112 may comprise a content streaming service, such as an Internet protocol video streaming service. The short video service 112 may be configured to distribute content 116 via a variety of transmission techniques. The short video service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the short video service 112 may comprise a video sharing service, a video hosting platform, a content distribution platform, a collaborative gaming platform, and/or the like.

In an embodiment, the content 116 distributed or provided by the short video service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, pulling pranks, or giving advice, such as beauty and fashion advice, cooking tips, or home renovation tips.

In an embodiment, the content 116 may be output to different client devices 104 via the network 120. The content 116 may be streamed to the client devices 104. The content stream may be a stream of short videos received from the short video service 112. The plurality of client devices 104 may be configured to access the content 116 from the short video service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The short video service 112 may be configured to receive input from users. The users may be registered as users of the short video service 112 and may be users of the content application 106 operating on client devices 104. The user inputs may include short videos created by users, user comments associated with short videos, or "likes" associated with short videos. The user inputs may include connection requests and user input data, such as text data, digital image data, or user content. The connection requests may comprise requests from the client devices 104a-d to connect to the short video service 112. The user input data may include information, such as short videos and/or user comments, that the users connected to the short video service 112 want to share with other connected users of the short video service 112.

The short video service 112 may be able to receive different types of input from users using different types of client devices 104. For example, a user using the content application 106 on a first user device, such as a mobile phone or tablet, may be able to create and upload short videos using the content application 106. A user using the content application 106 on a different mobile phone or tablet may also be able to view, comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104 to create a short video and upload the short video to the cloud network 102. The client devices 104 may access an interface 108 of the content application 106. The interface 108 may comprise an input element. For example, the input element may be configured to allow users to create the short video. To create the short video, the user may give the content application 106 permission to access an image capture device, such as a camera, or a microphone of the client device 104. Using the content application 106, the user may select a duration for the short video or set a speed for the short video, such as "slow-motion" or "speed things up."

The user may edit the short video using the content application 106. The user may add one or more texts, filters, sounds, or effects, such as beauty effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the cloud network 102 and/or to save the short video locally to the user device 104. When a user uploads the short video to the cloud network 102, they may choose whether they want the short video to be viewable by all other users of the content application 106 or viewable by only a subset of the users of the content application 106. The short video service 112 may store the uploaded short videos and any metadata associated with the short videos in one or more databases 114.

In an embodiment, a user may use the content application 106 on a client device 104 to provide input on a short video. The client devices 104 may access an interface 108 of the content application 106 that allows users to provide input associated with short videos. The interface 106 may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The short video service 112 may store the input and associated metadata in a database 114.

The short video service 106 may be configured to output the uploaded short videos and user input to other users. The users may be registered as users of the short video service 112 to view short videos created by other users. The users may be users of the content application 106 operating on client devices 104. The content application 106 may output (display, render, present) the short videos and user comments to a user associated with a client device 104. The client devices 104 may access an interface 108 of the content application 106. The interface 108 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The short video service 112 may output the short video and the associated comments simultaneously. Comments may be output by the short video service 112 in real-time or near-real-time. The content application 106 may display the short videos and comments in various ways on the client device 104. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 118 may process tasks associated with the short video service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

As discussed above, a user may use the content application 106 on a client device 104 to create a short video and upload the short video to the cloud network 102. In an embodiment, the short video created by the user via the content application 106 on the client device 104 may be a short video featuring the user moving a body part to the rhythm or beat of a pre-recorded audio overlay, such as the pre-recorded audio overlays described above. For example, the short video created by the user may be a short video featuring the user moving his or her own body part, such as the user's head and/or eyes, in a manner that corresponds to the rhythm or beat of a song or a song clip. As another example, the short video created by the user via the content application 106 on the client device 104 may be a short video featuring the user moving a different user's body part, such as the different user's head and/or eyes, in a manner that corresponds to the rhythm or beat of a song or a song clip. In other examples, a short video comprises an object that includes at least one part with movements in a plurality of images of the short video.

The client devices 104 may access an interface 108 of the content application 106. The interface 108 may comprise an input element. By way of example and without limitation, the input element may be configured to allow users to create the short video featuring an object moving one of its parts (e.g., the user or another user moving a body part) to the rhythm or beat of a pre-recorded audio overlay. For instance, to create the short video featuring the user moving a body part to the rhythm or beat of a pre-recorded audio overlay, the user may give the content application 106 permission to access an image capture device, such as a camera, or a microphone of the client device 104.

The client device 104 may utilize a feed captured by the image capture device to detect (e.g. locate) one or more parts of an object, such as one or more body parts of the user. For example, the client device 104 may utilize the feed captured by the image capture device to detect a head or face of the user. The one or more body parts detected by the camera may include those body parts that the user will move to the rhythm or beat of a pre-recorded audio overlay during the creation of the short video. For example, the client device 104 may utilize the feed captured by image capture device to detect a head or face of the user if the user will move his or her head/face to the rhythm or beat of a pre-recorded audio overlay during the creation of the short video.

In an embodiment, at least one of the short video service 112 or the client devices 104 comprise an object tracking and detection model 110. The object tracking and detection model 110 may be utilized, at least in part, to detect (e.g. locate) the one or more parts of an object (e.g., body parts of the user) in the feed captured by the image capture device. The object tracking and detection model 110 may be utilized, for example, to detect the body part(s) that the user will move to the rhythm or beat of a pre-recorded audio overlay during the creation of the short video. For example, if the user will move his or her head/face to the rhythm or beat of a pre-recorded audio overlay during the creation of the short video, then the object tracking and detection model 110 may be utilized to detect the user's head, face, and/or eyes in the feed captured by the image capture device.

The object tracking and detection model 110 may be configured to automatically extract information from an image, such as a photograph or a poster, a scene, such as a real-world environment, or a video stream. In an embodiment, the object tracking and detection model 110 may use positive and negative training applied by a machine learning algorithm or computer vision algorithms to extract information, such as labels or identifying properties, from an image, scene, or video stream. Once extracted, the information may be used to detect at least one object, feature, or element of interest (e.g. one or more body part(s)) that is present in the image, scene, or video stream. The object tracking and detection model 110 may be configured to identify the objects, features, or elements of interest (e.g. one or more body part(s)) that have been detected in the image or in the scene. For example, the object tracking and detection model 110 may be configured to identify a detected body part as specific part body, such as a head, face, eyes and/or any other specific body part.

In an embodiment, to identify the objects, features, or elements of interest (e.g. one or more body part(s)) that are present in the image, scene, or video stream, the object tracking and detection model 110 compares a detected object, feature, or element of interest with information stored in a database, such as the database 114. The information stored in the database may comprise information about objects, features, or elements of interest, such as body parts, that have already been imaged and characterized. In the event that the detected object, feature, or element of interest matches an object, feature, or element of interest stored in the database, the object tracking and detection model 110 identifies the detected object, feature, or element of interest as the object, feature, or element of interest. For example, if the object tracking model detects a body part in the feed captured by the image capture device in the feed captured by the image capture device, the body part may be compared with information stored in the database to determine which type of body part the detected body part is. For example, the body part may be compared with information stored in the database to determine that the body part is a head, face, and/or any other specific body part.

In an embodiment, the information extracted by the object tracking and detection model 110 includes one or more measurements associated with an object, feature, or element of interest (e.g. one or more body part(s)). For example, the one or more measurements may include information about the dimensions of a body part, the placement of the body part relative to other objects and/or body parts in the scene, or geometric or topological information. In one example, the object tracking and detection model 110 may match pixels in the feed taken from a user's image capture device (e.g. camera) with a set of points associated with the stored model of the body part. The object tracking and detection model 110 may be configured to determine a number of corresponding lines associated with the body part. For example, the set of points may be a connected series of line segments or links, such as a polyline, that the object tracking and detection model 110 has generated and fitted to the set of pixels. The object tracking and detection model 110 may also determine slope angles for each link in the polyline. In short it is known to identify lines in one or more graphic images or camera feeds with lines in a model associated with an object in order to identify the object. Other techniques may be used to identify objects, such as body parts, in an image or camera feed.

The content application 106 may augment graphics, video, sound, and/or other inputs on the detected objects, such as the detected body parts. For instance, the content application 106 may lay digital elements, such as one or more image overlays, over a detected body part in a camera feed. For example, if a head/face and eyes are detected in the camera feed, such as via the object tracking and detection model 110, the content application 106 may lay an image overlay over the user's eyes. The image overlay may include, for example, two circles that cover at least a portion of each of the user's eyes. The image overlay may be any other shape and/or any color or size. As another example, if a different body part (e.g. a body part other than the head/face and eyes) is detected in the camera feed, the content application 106 may lay an image overlay over that different body part so that at least a portion of the different body part is covered by the image overlay.

The image overlay(s) may move along with the body part over which it is laid. For example, an image overlay on the user's eyes may move with the user's head/face or eyes. For example, if the user moves his or her head/face to the right (thus moving his or her eyes to the right), image overlay(s) over the user's eyes may also move to the right so that the overlays remain over the user's eyes. Similarly, if the user moves his or her head/face to the left (thus moving his or her eyes to the left), image overlay(s) on the user's eyes may also move to the left so that the overlays remain over the user's eyes. The image overlay(s) on the user's eyes may move in any other direction so that the overlays remain over the user's eyes, regardless of how or where the user has moved his head/face.

In an embodiment, the content application 106 may lay different or additional image overlays over the camera feed. For example, the content application 106 may lay one or more target images over the camera feed. The target image(s) may be overlaid in various locations on the camera feed. The various locations may be randomly selected and/or the locations may be selected according to an algorithm. The target image(s) may be any size, shape, or color. For example, the target image may be a smiley face, one or more circles, and/or any other image. The content application 106 may lay one target image at a time on the camera feed, and/or the content application 106 may lay more than one target at a time on the camera feed.

The image overlay(s) may remain over the detected body part(s) during at least a portion of the short video created by the user. During creation of the short video, the user may attempt to align the image overlay(s) with the one or more target images. The user may attempt to align the image overlay(s) with one or more targets at predetermined times and/or at times that correspond to a rhythm or a beat of a pre-recorded audio overlay, such as a song-clip. For example, the user may attempt to align image overlay(s) on his or her eyes with a target image on the beat of the song. The target image may be a smiley face with two "eyes" and the image overlay(s) on his or her eyes may include a circle (or any other shape) covering at least a portion of each eye. The user may attempt to align the circles covering each of his eyes with the "eyes" of the smiley face on the beat of the song. Any other body part overlay and/or target image may be utilized instead.

In an embodiment, the user may attempt to align the body part (rather than the image overlay(s)) with the one or more target images. The user may attempt to align the body part with one or more targets at predetermined times and/or at times that correspond to a rhythm or a beat of a pre-recorded audio overlay, such as a song-clip. For example, the user may attempt to align his or her eyes with a target image on the beat of the song. The target image may be a smiley face with two "eyes." The user may attempt to align his eyes with the "eyes" of the smiley face on the beat of the song. Any other target image may be utilized instead.

In an embodiment, the content application 106 may utilize the object tracking and detection model 110 to determine whether, during creation of the short video (e.g. during recording of the short video) a body part, such as a user's eyes, aligns and/or approximately aligns with the target image. For example, the object tracking and detection model 110 may be utilized to determine if the image overlay(s) on the body part (such as the overlay(s) on eyes) aligns and/or approximately aligns with the target image, such as the "eyes" of a smiley face target. The image overlay(s) on the body part (such as the overlay(s) on eyes) may align with the target image when the image overlay(s) on the body part and the target image completely overlap (e.g. are in the same location on the camera feed). The image overlay(s) on the body part (such as the overlay(s) on the user's eyes) may approximately align with the target image when the image overlay(s) on the body part and the target image partially, or almost completely (e.g. within a predetermined distance threshold), overlap.

In an embodiment, at least one of the short video service 112 or the client devices 104a-d comprise a beat tracking model 111. The content application 106 may utilize the beat tracking model 111 to determine whether one or more body parts approximately align with one or more target image at a time proximate to a beat of selected pre-recorded audio overlay, such as a selected piece of music. The piece of music may be selected, for example, by the user and/or the piece of music may be randomly selected. The piece of music may have a known beat and/or rhythm.

In an embodiment, the beat tracking model 111 may keep track of timestamps that are indicative of one or more times corresponding to the beat and/or rhythm of the selected piece of music. The beat tracking model 111 may also keep track of and/or generate timestamps that are indicative of one or more times at which the body part(s) align or approximately align with the target image. The beat tracking model 111 may compare the timestamps indicative of the time(s) at which the body part(s) align or approximately aligned with the target image with the timestamps corresponding to the beat and/or rhythm of the selected piece of music to determine whether the body part(s) align or approximately align with the target image at a time proximate to a beat of the selected piece of music.

The content application 106 may lay, during creation of the short video (e.g. during recording of the short video), feedback image overlays. The feedback image overlays may be indicative of whether the body part(s), such as the user's eyes, align and/or approximately align with the target image at a time proximate to a beat and/or rhythm of the selected piece of music. For example, the feedback image overlays may be indicative of whether the beat tracking model 111 determined that a body part was aligned or approximately aligned with the target image at a time proximate to a beat of the selected piece of music. The feedback image overlays may indicate, to a user, whether the body part was aligned with the target image on the beat of the selected piece of music, almost aligned with the target image on the beat of the selected piece of music (e.g. almost on beat or within a predetermined time of the beat), or not aligned with the target image on the beat of the selected piece of music (e.g. not on beat or not within a predetermined time of the beat).

The feedback image overlays may be different depending on whether the body part was aligned with the target image on beat, almost on beat, or not on beat. For example, a first type of feedback image overlay may be used if the body part aligns or approximately aligns with the target image on the beat of the selected piece of music. The first type of feedback image may be, for example, one or more hearts. A second type of feedback image overlay may be used if the body part aligns or approximately aligns with the target image almost on the beat of the selected piece of music. The second type of feedback image may be, for example, green or blue circles. A third type of feedback image overlay may be used if the body part does not align or approximately align with the target image on beat. The third type of feedback image may be, for example, x-marks or crosses. Any other type of feedback image may be used (e.g. any size, color, and/or shape). One or more of the first, second, or third feedback images may be the same. For example, the second and third type of feedback image may be the same.

In an embodiment, each of the different types of feedback images may be overlaid on the target image. For example, if a pair of eyes and/or image overlay(s) on a pair of eyes align or approximately align with the "eyes" of a smiley face target image on beat, the first type of feedback image (e.g. a pair of hearts) may appear on the "eyes" of the smiley face target image. As another example, if a pair of eyes or the image overlay(s) on a pair of eyes do align or approximately align with the "eyes" of a smiley face target image almost on beat, the second type of feedback image (e.g. blue or green circles) may appear on the "eyes" of the smiley face target image. As another example, if the pair of eyes or the image overlay(s) on a pair of eyes do not align or approximately align with the "eyes" of a smiley face target image on beat or almost on beat, the third type of feedback image (e.g. x-marks or crosses) may appear on the "eyes" of the smiley face target image. In another embodiment, each of the different types of feedback images may additionally, or alternatively, be overlaid on the body part(s). For example, the feedback images may be overlaid on the image overlay(s) on the body part body part (such as on the overlay(s) on eyes).

In an embodiment, the beat tracking model 111 may keep track of how many times the body part or the image overlay on the body part(s) has aligned or approximately aligned with the target image on the beat of the song. For example, the beat tracking model 111 may keep track of how many times the image overlay on the body part(s) has aligned or approximately aligned with the target image on the beat of the song to determine whether the body part(s) has aligned or approximately aligned with the target image on the beat of the song a predetermined number of times. The predetermined number of times may be, for example, a goal that the user attempts to achieve during creation of the short video (e.g. during recording of the short video). For example, the user may attempt to align or approximately align the body part with the target image on the beat of the song a predetermined number of times, such as five, six, or seven (or any number), during creation of the short video.

In an embodiment, at least one of the short video service 112 or the client devices 104a-d comprise a video segmentation model 109. The short video being created may be comprised of a series of frames. Each frame in the series of frames may be an image, such as a 2D image. The video segmentation model 109 may be configured to, during creation of the short video, segment the series of frames (i.e. the series of images), into multiple regions to determine information about an object, feature, or element of interest. For example, the video segmentation model 109 may be configured to, during creation of the short video, segment the series of frames (i.e. the series of images), into multiple regions to determine information about one or more body part(s). The one or more body part(s) may include those body part(s) detected by the object tracking and detection model 110.

The information about the one or more body part(s) may be used to determine the boundaries and/or outline of the one or more body part(s). The information about the one or more body part(s) may be used to differentiate the body part(s) from other objects in the series of frames. For example, the information about a head or face may be used by the video segmentation model 109 to differentiate the head or face from other body parts, such as a neck or chest, in the series of frames. Once the body part has been differentiated, the video segmentation model 109 may separate the body part from the remainder of the frame(s).

In an embodiment, the video segmentation model 109 may be configured to capture an image of the body part once it has been separated from the remainder of the frame. The video segmentation model 109 may be configured to capture the image(s) of the body part at certain times. For example, the video segmentation model 109 may be configured to capture the image(s) of the body part when the body part(s) align with the target image on the beat of the selected piece of music. As another example, the video segmentation model 109 may be configured to capture the image(s) of the body part when the body part(s) align with the target image almost on the beat of the selected piece of music. As another example, the video segmentation model 109 may be configured to capture the image(s) of the body part when the body part(s) do not align with the target image on the beat of or almost on the beat of the selected piece of music. As another example, the video segmentation model 109 may be configured to capture the image(s) of the body part irrespective of whether the body part(s) align with the target image on the beat of the selected piece of music (e.g. the video segmentation model 109 may be configured to capture the image(s) of the body part at random times and/or at other predetermined times). This may continue until creation of the short video has terminated.

In an embodiment, the content application 106 outputs, during creation of the short video (e.g. during recording of the short video), the one or more captured images of the body part(s) in a top bar on the camera feed. For example, if the video segmentation model 109 is configured to capture the image(s) of the body part when the body part(s) align with the target image on the beat of the selected piece of music, and the user has aligned the body part(s) with the target image five times so far, five different captured images of the body part may be output in a top bar on the camera feed. If the user then aligns the body part(s) with the target image for a sixth time, a new, sixth captured image of the body part may be added to the top bar on the camera feed. This may continue until creation of the short video has terminated.

The content application 106 may output, during creation of the short video (e.g. during recording of the short video), animated overlay(s). The animated overlay(s) may include the images of the body part(s) captured by the video segmentation model 109. For example, the animated overlay(s) may be configured to move across the camera feed while the short video is still being recorded. The animated overlay(s) may be configured to move across the camera feed in any direction, such as towards the target image(s). The animated overlay(s) may move across the camera feed at any speed. One or more animated overlay(s) may move across the camera feed at any one time. During the duration of the short video creation, a plurality of animated overlay(s) may move across the camera feed.

The animated overlay(s) may be configured to move across the camera feed so that they reach the target image(s) at pre-determined times, such as at times that correspond to the beat of the selected music piece. For example, the beat tracking model 111 may keep track of the times (e.g. the timestamps) during the selected music piece that correspond to the beat and/or rhythm of that music piece. The location(s) of the target image(s) may be known. The timestamps associated with the beat of the music sample and the location(s) of the target image(s) may be used, in combination, to determine when the animated overlay(s) should begin moving across the camera feed so that the animated overlay(s) reach the location of the target image(s) at the desired time (e.g. on beat).

In an embodiment, content application 106 may output animated overlay(s) towards the end of creation of the short video. For example, creation of the short video may be terminated when a predetermined time period has lapsed. As another example, creation of the short video may be terminated when the image overlay on the body part(s) has aligned or approximately aligned with the target image on the beat of the song a predetermined number of times. As discussed above, the predetermined number of times may be, for example, a goal that the user attempts to achieve during creation of the short video (e.g. during recording of the short video). For example, the user may attempt to align or approximately align the body part with the target image on the beat of the song a predetermined number of times, such as five, six, or seven (or any number), during creation of the short video. Before terminating creation of the short video, the content application 106 may output animated overlay(s). The animated overlay(s) may include the images of the body part(s) captured by the video segmentation model 109. For example, the animated overlay(s) may be configured to move down from a top bar and rotate around the user's head or face.

The user may be aware that the video segmentation model 109 is configured to capture one or more images of the body part(s). As a result, the user may attempt to contort and/or control the body part(s) in a particular way so that the captured images are entertaining or interesting. For example, if the body part is a head or a face, the user may attempt to make a funny face when the image(s) of his or her face are captured by the video segmentation model 109. As a result, any animated overlay(s) based on the captured images that are output during creation of the short video may be entertaining. This may increase the likelihood that other users who watch the short video will find it to be entertaining.

In an embodiment, the animated overlay(s) may include images of a body part belonging to one or more users other than the user creating the short video. For example, the animated overlay(s) may include a different user's head/face. The different user may be a friend, family member, or a complete stranger. For example, the different user may be a user of the short video service 112 that has previously created a short video in the manner described above. When the different user previously created a short video in the manner described above, that user's body part(s) may have been segmented and saved as an image. This image may be utilized by one or more subsequent creators of short videos.

The animated overlay(s) of the other user's body part(s) may be configured to move across the camera feed while the user attempts to align the user's body part(s) with one or more target images (e.g. while the short video is still being recorded). The animated overlay(s) of the other user's body part(s) may be configured to move across the camera feed in any direction, such as towards the target image(s). The animated overlay(s) of the other user's body part(s) may move across the camera feed at any speed. One or more animated overlay(s) of the other user's body part(s) may move across the camera feed at any one time.

Figure 2:
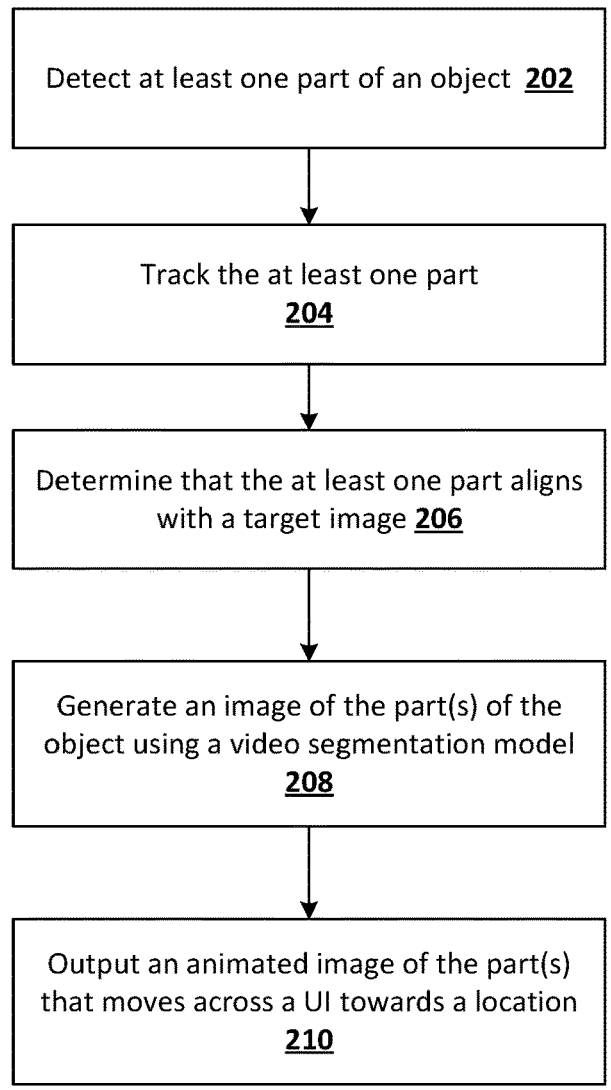
FIG. 2 shows an example method for creating content, which may be performed by a user device in accordance with the present disclosure.

FIG. 2 illustrates an example process 200 performed by the client device (e.g. client device 104). The client device 104 may perform the process 200 to create a short video for uploading to a short video service, such as the short video service 112. Once uploaded to the short video service, the short video may be viewed by users of the short video service. Although depicted as a sequence of operations in FIG. 2, those of ordinary skill in the art will appreciate that various embodiments may add, remove, reorder, or modify the depicted operations.

As described above, a feed captured by an image capture device may be utilized to detect (e.g. locate) one or more body parts. For example, a client device may utilize the feed captured by the image capture device to detect a user's head or a face. The one or more detected body parts may include those body parts that the user will move to the rhythm or beat of a pre-recorded audio overlay during the creation of the short video.

At 202, at least one part of an object may be detected. For example, the at least one part of an object (e.g., a user) may be detected by an object tracking and/or detection model, such as the object tracking and detection model 110. The object tracking and detection model may be utilized, at least in part, to detect (e.g. locate) the one or more body parts in the feed captured by the image capture device. The object tracking and detection model may be utilized, for example, to detect the body part(s) that the user will move to the rhythm or beat of a pre-recorded audio overlay during the creation of the short video. For example, if the user will move his or her head/face to the rhythm or beat of a pre-recorded audio overlay during the creation of the short video, then the object tracking and detection model may be utilized to detect the user's head, face, and/or eyes in the feed captured by the image capture device.

As also described above, the content application 106 may lay image overlays over the camera feed. For example, the content application 106 may lay one or more target images over the camera feed. The target image(s) may be overlaid in various locations on the camera feed. The various locations may be randomly selected and/or the locations may be selected according to an algorithm. The target image(s) may be any size, shape, or color. For example, the target image may be a smiley face, one or more circles, and/or any other image. The content application 106 may lay one target image at a time on the camera feed, and/or the content application 106 may lay more than one target at a time on the camera feed.

During creation of the short video, the user may attempt to align the at least one part with the one or more target images. The user may attempt to align the at least one part with the one or more target images at predetermined times and/or at times that correspond to a rhythm or a beat of a selected pre-recorded audio overlay, such as a song-clip. For example, the user may attempt to align his or her eyes with a target image on the beat of the song. The target image may be a smiley face with two "eyes." The user may attempt to align his or her eyes with the "eyes" of the smiley face on the beat of the song. Any other target image may instead be utilized.

The content application 106 may utilize the object tracking and detection model to determine whether, during creation of the short video (e.g. during recording of the short video) the at least one part aligns and/or approximately aligns with the target image. At 204, the at least one part may be tracked. For example, the object tracking and detection model may be utilized to determine if a pair of eyes and/or a face align or approximately align with the target image, such as the "eyes" of a smiley face target. The at least one part may align with the target image when the at least one part and the target image completely overlap. The at least one part may approximately align with the target image when the at least one part and the target image partially, or almost completely (e.g. within a predetermined distance threshold), overlap. At 206, it may be determined that the at least one part or at least one portion of the at least one part aligns or approximately aligns with the target image.

The short video being created may be comprised of a series of frames. Each frame in the series of frames may be an image, such as a 2D image. A video segmentation model, such as the video segmentation model 109, may be configured to, during creation of the short video, segment the series of frames (i.e. the series of images), into multiple regions to determine information about the at least one part. The information about the one or more body part(s) may be used to determine the boundaries and/or outline of the at least one part. The information about the at least one part may be used to differentiate the at least one part from other objects in the series of frames. For example, the information about a head or face may be used by the video segmentation model to differentiate the head or face from other body parts, such as a neck or chest, in the series of frames. Once the at least one part has been differentiated, the video segmentation model may separate the at least one part from the remainder of the frame(s).

The video segmentation model may be configured to capture an image of the at least one part once it has been separated from the remainder of the frame. At 208, an image of the at least one part may be generated using the video segmentation model. The video segmentation model may be configured to capture the image of the at least one part at certain times. For example, the video segmentation model may be configured to capture the image of the at least one part when the at least one part aligns with the target image (regardless of whether the alignment occurs on the beat of the selected piece of music). As another example, the video segmentation model may be configured to capture the image of the at least one part only when the at least one part aligns with the target image on the beat or approximately on the beat of the selected piece of music. As another example, the video segmentation model may be configured to capture the image of the at least one part when the at least one part does not align with the target image on the beat of the selected piece of music. As another example, the video segmentation model may be configured to capture the image of the at least one part at random times and/or at other predetermined times not related to the beat of the selected piece of music.

The content application 106 may output, during creation of the short video (e.g. during recording of the short video), animated overlay(s). The animated overlay(s) may include the images of the at least one part captured by the video segmentation model. For example, the animated overlay(s) may be configured to move across the camera feed while the short video is still being recorded. At 210, an animated image of the at least one part of the object or the at least one portion of the at least one part of the object may be output. The animated overlay(s) may be configured to move across the camera feed in any direction, such as towards at least one other target image. The animated overlay(s) may move across the camera feed at any speed. One or more animated overlay(s) may move across the camera feed at any one time. During the duration of the short video creation, a plurality of animated overlay(s) may move across the camera feed.

The animated overlay(s) may be configured to move across the camera feed so that they reach the at least one other target image at pre-determined times, such as at times that correspond to the beat of the selected music piece. For example, a beat tracking model, such as the beat tracking model 111, may keep track of the times (e.g. the timestamps) during the selected music piece that correspond to the beat and/or rhythm of that music piece. The location of the at least one other target image may be known. The timestamps associated with the beat of the music sample and the location of the at least one other target image may be used, in combination, to determine when the animated overlay(s) should begin moving across the camera feed so that the animated overlay(s) reaches the location of the at least one other target image at the desired time (e.g. on beat).

The above process of tracking the at least one part, determining if the at least one part aligned with a target image, generating an image of the at least one part, and outputting an animated overlay of the image(s) of the at least one part may continue until creation of the short video has terminated. Creation of the short video may be terminated, for example, when the at least one part has aligned with a target image a predetermined number of times (e.g. seven times) and/or when a predetermined time has elapsed (e.g. one minute). After the short video has been created, it may be uploaded to the short video service for viewing by other users of the short video service.

Figure 3:
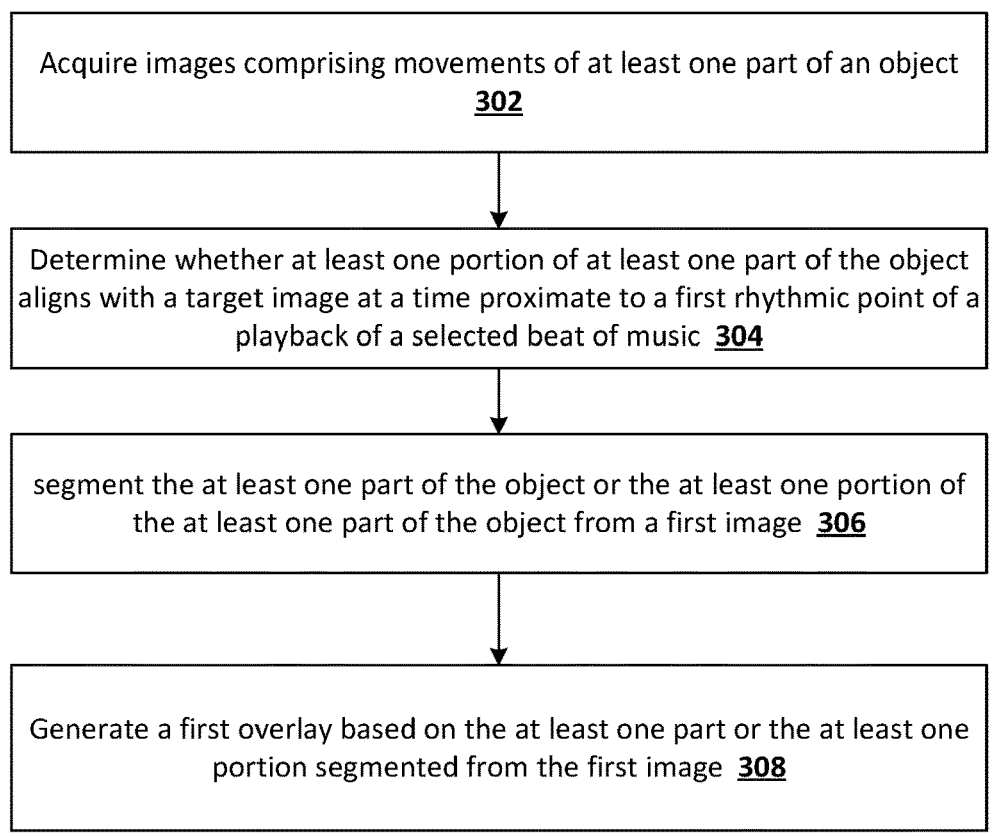
FIG. 3 shows another example method for creating content, which may be performed by a user device in accordance with the present disclosure.

FIG. 3 illustrates an example process 300 performed by the client device (e.g. client device 104). The client device 104 may perform the process 300 to create a short video for uploading to a short video service, such as the short video service 112. Once uploaded to the short video service, the short video may be viewed by users of the short video service. Although depicted as a sequence of operations in FIG. 3, those of ordinary skill in the art will appreciate that various embodiments may add, remove, reorder, or modify the depicted operations.

Creation of the short video (e.g. recording of the short video) may be initiated. For example, a user that wants to create the short video may initiate the creation via content application 106. By way of example and without limitation, the short video may be a video that features the user moving one or more predetermined body part to the rhythm or beat of a pre-recorded audio overlay, such as the pre-recorded audio overlays described above. The pre-recorded audio overlay may include a piece of music selected by the user and/or may be randomly selected. For example, the short video created by the user may be a short video featuring the user moving one or more predetermined body part, such as the user's head and/or eyes, in a manner that corresponds to the rhythm or beat of the selected piece of music. At 302, images comprising movements of an object (e.g., a user) may be obtained, e.g., recorded by way of an image capture device, such as a camera of a client device (e.g. client device 104). The movements may include movements of the one or more predetermined part, such as the user's head and/or eyes. The movements may, for example, include movements of the one or more predetermined body part towards one or more target images.

As described above, the one or more target images may be overlaid over the camera feed. The one or more target images may be overlaid in various locations on the camera feed. The various locations may be randomly selected and/or the locations may be selected according to an algorithm. The one or more target images may be any size, shape, or color. For example, the one or more target images may be a smiley face, one or more circles, and/or any other image. Only one target image may be overlaid at a time on the camera feed, or more than one target image may be overlaid at a time on the camera feed.

During creation of the short video, the user may attempt to align the one or more predetermined body part with the one or more target images. The user may attempt to align the one or more predetermined body part with the one or more target images at predetermined times and/or at times that correspond to a rhythm or a beat of a selected pre-recorded audio overlay, such as a song-clip. For example, the user may attempt to align his or her eyes with a target image on the beat of the song. The target image may be a smiley face with two "eyes." The user may attempt to align his or her eyes with the "eyes" of the smiley face on the beat of the song. Any other target image may instead be utilized.

At 304, it may be determined whether the at least one part of the object (e.g., the user) aligns or approximately aligns with a target image overlaid on a first image among a plurality of video image. For example, an object tracking model, such as the object tracking and detection model 110, may be utilized to determine if the one or more body parts aligns or approximately aligns with the target image, such as the "eyes" of a smiley face target. The one or more body parts may align with the target image when the one or more body parts and the target image completely overlap (e.g. are in the same location on the camera feed). The one or more body parts may approximately align with the target image when the one or more body parts and the target image partially, or almost completely overlap (e.g. within a predetermined distance threshold).

It may additionally be determined whether the at least one part of the user aligns or approximately aligns with the target image at a time proximate to a rhythmic point (e.g., a beat) of a playback of a selected piece of music. For example, a beat tracking model, such as the beat tracking model 111, may be utilized to determine whether the at least one part of the user aligns or approximately aligns with one or more target image at a time proximate to a beat of selected pre-recorded audio overlay, such as the selected piece of music. The piece of music may have a known beat and/or rhythm. The beat tracking model may keep track of timestamps that are indicative of one or more times corresponding to the beat and/or rhythm of the selected piece of music. The beat tracking model may also keep track of and/or generate timestamps that are indicative of one or more times at which the at least one part of the user aligns or approximately aligns with the target image. The beat tracking model may compare the timestamps indicative of the time(s) at which the at least one part of the user aligned or approximately aligned with the target image with the timestamps corresponding to the beat and/or rhythm of the selected piece of music to determine whether the body part(s) align or approximately align with the target image at a time proximate to a beat of the selected piece of music.

As described above, a video segmentation model, such as the video segmentation model 109, may be configured to capture one or more images of the at least one part of the user at certain times. For example, the video segmentation model may be configured to capture the one or more images of the at least one part of the user when the at least one part of the user aligns or approximately aligns with the target image on the beat of the selected piece of music. As another example, the video segmentation model may be configured to capture the one or more images of the at least one part of the user when the at least one part of the user aligns or approximately aligns with the target image almost on the beat of the selected piece of music. As another example, the video segmentation model may be configured to capture the one or more images of the at least one part of the user when the at least one part of the user does not align with the target image on the beat of or almost on the beat of the selected piece of music. As another example, the video segmentation model may be configured to capture the one or more images of the at least one part of the user irrespective of whether the at least one part of the user aligns with the target image on the beat of the selected piece of music (e.g. the video segmentation model may be configured to capture the one or more images of the at least one part of the user at random times and/or at other predetermined times).

In an embodiment, the video segmentation model may be configured to capture one or more images of a different user or a part of a different user (e.g. a user other than the user creating the video). The part of the different user may include any body part of the different user, such as a different user's head/face. The different user may be a friend, family member, or a complete stranger. For example, the different user may be a user of the short video service 112 that has previously created a short video in the manner described above. When the different user previously created a short video in the manner described above, that user's body part(s) may have been segmented and saved as an image. This image may be utilized by one or more subsequent creators of short videos.

At 306, the at least one part of the object or the at least one portion of the at least one part of the object may be segmented from a first image in response to determining that the at least one portion aligns with the target image at the time proximate to a first rhythmic point of the playback of the selected piece of music. In some embodiments, the at least one part of the object has movements in a plurality of images. The at least one portion of the at least one part of the object in a second image among the plurality of images may be determined to align with the target image at a time proximate to a second rhythmic point. Then the at least one part of the object or the at least one portion of the at least one part of the object may be segmented from a second image.

In one example, the first image, the second image and other images may be sequential images with different time stamps.

An animation overlay may be generated based on the segmented part or portion. The animation overlay may be generated based on the image of the at least one part of the object (e.g., the user), an image of another object, different part of the object, and/or an image of a different user. The animation overlay may be output on the camera feed during creation of the short video. The animation overlay may be configured to move across the camera feed while the short video is still being recorded. The animation overlay may be configured to move across the camera feed in any direction, such as towards the target image(s). The animation overlay may move across the camera feed at any speed. One or more animation overlays may move across the camera feed at any one time. During the duration of the short video creation, a plurality of animation overlays may move across the camera feed.

The animation overlay may be configured to move across the camera feed so that it reaches the target image(s) at pre-determined times, such as at times that correspond to the beat of the selected music piece. For example, the beat tracking model may keep track of the times (e.g. the timestamps) during the selected music piece that correspond to the beat and/or rhythm of that music piece. The location(s) of the target image(s) may be known. The timestamps associated with the beat of the music sample and the location(s) of the target image(s) may be used, in combination, to determine when the animation overlay should begin moving across the camera feed so that the animation overlay reaches the location of the target image(s) at the desired time (e.g. on beat).

At 308, a first overlay may be generated and combined into a short video. Generating the short video may comprise combining at least a portion of the playback of the selected piece of music, at least a portion of the video image (e.g. one or more frames of the captured video), and at least a portion of the animation into a video. In an example, the user's goal of aligning the at least one part of an object (e.g., the user) with the target image may cause the user to exaggerate movements for the generated content. For example, the user may attempt to contort and/or control the at least one part in a particular way so that the captured images are entertaining or interesting. For example, if the at least one body part is a head or a face, the user may attempt to make a funny face when the image(s) of his or her face are captured by the video segmentation model. Generation of the short video may be terminated, for example, when the at least one part of the user has aligned with a target image a predetermined number of times (e.g. seven times) and/or when a predetermined time has elapsed (e.g. one minute). After the short video has been generated, it may be uploaded to the short video service for viewing by other users of the short video service.

Figure 4:
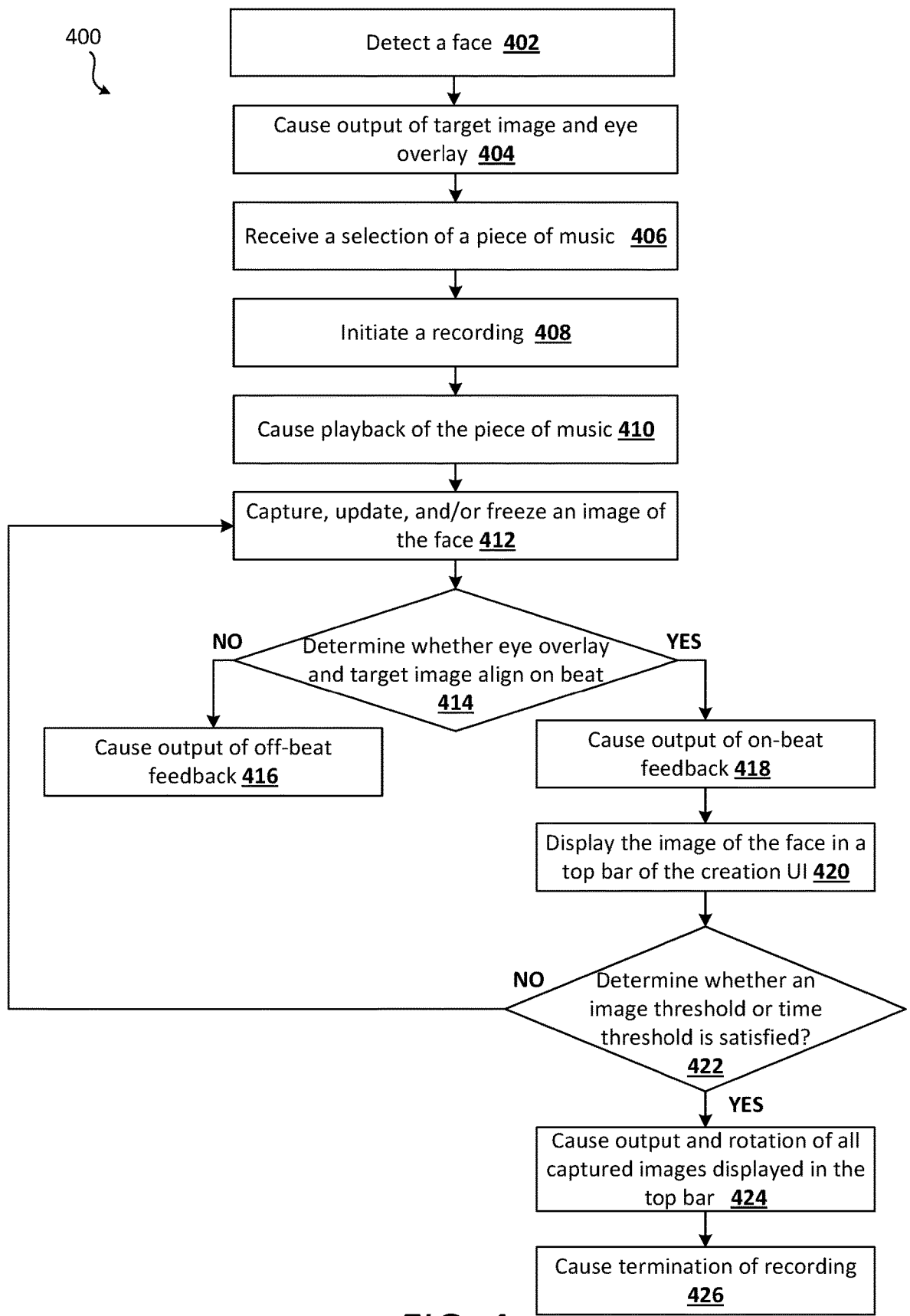
FIG. 4 shows another example method for creating content, which may be performed by a user device in accordance with the present disclosure.

FIG. 4 illustrates an example process 400 performed by the client device (e.g. client device 104). The client device 104 may perform the process 400 to create a short video for uploading to a short video service, such as the short video service 112. Once uploaded to the short video service, the short video may be viewed by users of the short video service. Although depicted as a sequence of operations in FIG. 4, those of ordinary skill in the art will appreciate that various embodiments may add, remove, reorder, or modify the depicted operations.

As described above, a client device, such as the client device 104, may utilize a feed captured by the image capture device to detect (e.g. locate) one or more body parts, such as one or more body parts of the user. The one or more body parts detected by the camera may include those body parts that the user will move to the rhythm or beat of a pre-recorded audio overlay during the creation of the short video. For example, the client device may utilize the feed captured by image capture device to detect a head or face of the user if the user will move his or her head/face to the rhythm or beat of a pre-recorded audio overlay during the creation of the short video.

Figure 5:
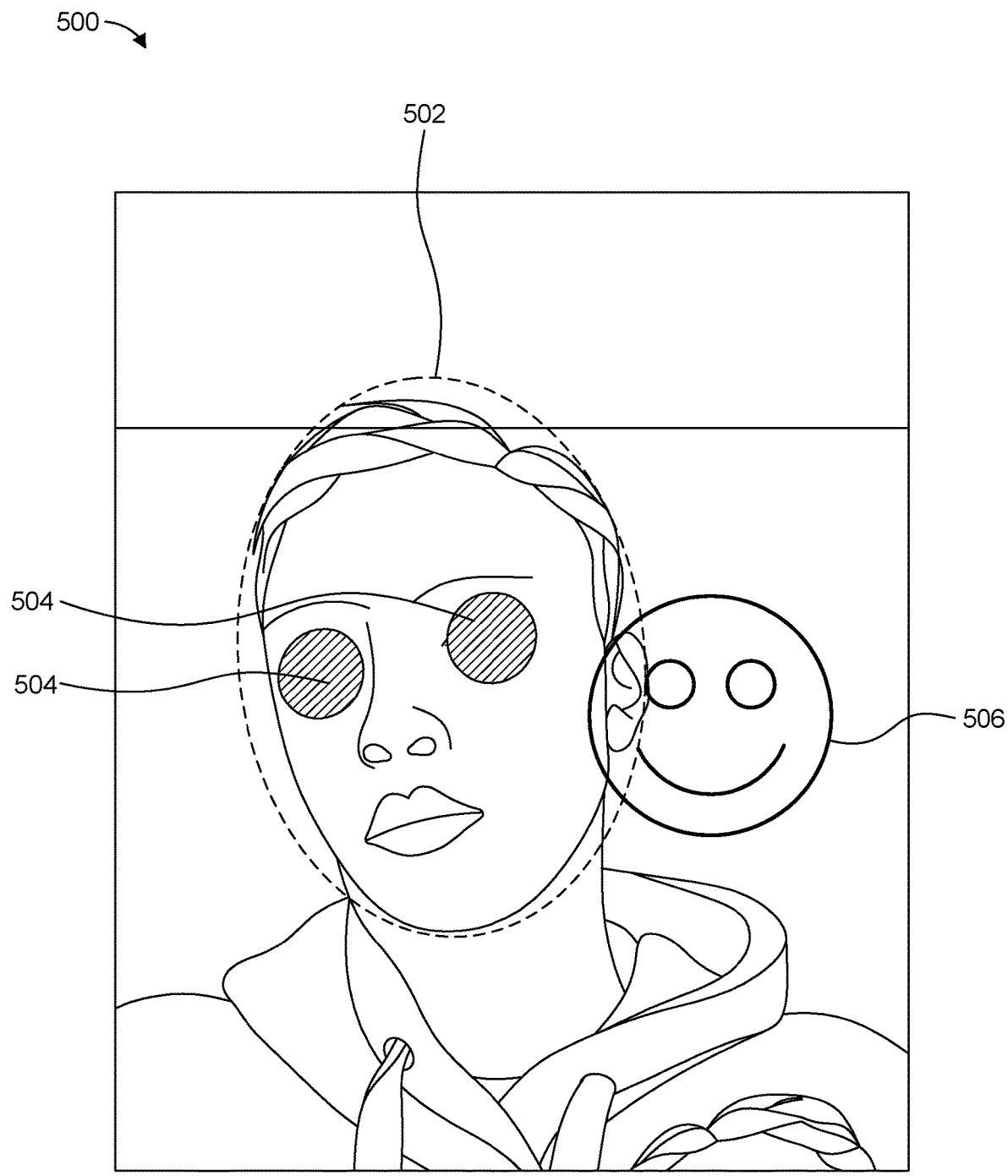
FIG. 5 shows an example user interface of a content distribution application in accordance with the present disclosure.

At 402, a face may be detected. An object tracking and detection mode, such as the object tracking and detection model 110 described above, may be utilized, at least in part, to detect (e.g. locate) the face. FIG. 5 illustrates an example UI 500 depicting a detected face 502. The detected face 502 may be the face of a user that wants to create a short video. For example, the user may be a user of a short video service, such as the short video service 112. The face 502 may be detected, for example, by an object tracking and detection model.

At 404, output of a target image and an eye overlay may be caused. Graphics, video, sound, and/or other inputs may be overlaid on the detected face 502 depicted in FIG. 5. For instance, one or more images, such as the image overlay 504, may be overlaid on at least a portion of the detected face 502, such as over the user's eyes. The image overlay 504 may include, for example, two circles that cover at least a portion of each of the user's eyes. The image overlay 504 may be any other shape and/or any color or size. The image overlay 504 may cover both of the entire eyes or only a portion of the eyes. The image overlay 504 may move along with the detected face 502. For example, if the user moves his head/face 502 to the right (thus moving his or her eyes to the right), image overlay 504 may also move to the right so that the image overlay 504 remains over the user's eyes. Similarly, if the user moves his or her head/face 502 to the left (thus moving his or her eyes to the left), image overlay 504 on the user's eyes may also move to the left so that the image overlay 504 remains over the user's eyes. The image overlay 504 may move in any other direction so that the image overlay 504 remains over the user's eyes, regardless of how or where the user moves his head/face 502.

One or more target images 506 may additionally, or alternatively, be laid over the camera feed. The one or more target images 506 may be overlaid in various locations on the camera feed. The various locations may be randomly selected and/or the locations may be selected according to an algorithm. The one or more target images 506 may be any size, shape, or color. For example, the one or more target images 506 may be a smiley face, one or more circles, and/or any other image. One target image 506 may be output at a time on the camera feed, or more than one target image 506 may be output at a time on the camera feed.

Before the user begins creating the short video (e.g. before recording begins), a piece of music may be selected. At 406, a selection of a piece of music may be received. The selection of the piece of music may be received from, for example, the user. Alternatively, the selection of the piece of music may be randomly selected. The piece of music may be selected from a music library, such as a music library associated with the short video service. Alternatively, the piece of music may be selected from an online database of music or a music library on the client device. The selected piece of music may have a known beat and/or rhythm. For example, timestamps may be associated with the known beat and/or rhythm of the selected piece of music. The timestamps may indicate the time(s) during the selected piece of music that correspond to the beat of the piece of music.

At 408, a recording may be initiated. The user may initiate the recording, such as after selecting the piece of music. Alternatively, the recording may be automatically initiated, such as after the piece of music is selected. During creation of the video (e.g. during recording), the selected piece of music may be played. At 410, playback of at least a portion of the piece of music may be caused. The image overlay 504 may remain over the detected face 502 during at least a portion of playback of the piece of music. During playback of the piece of music, the user may attempt to align the detected face 502 with the target image 506. For example, the user may attempt to align image overlay 504 with the target image 506. The user may attempt to align the detected face 502 and/or the image overlay 504 with the target image 506, for example, at predetermined times and/or at times that correspond to a predetermined rhythm or a beat of the piece of music. For example, the user may attempt to align the circles covering each of his eyes with the "eyes" of the smiley face target image 506 on the beat of the song.

Figure 6:
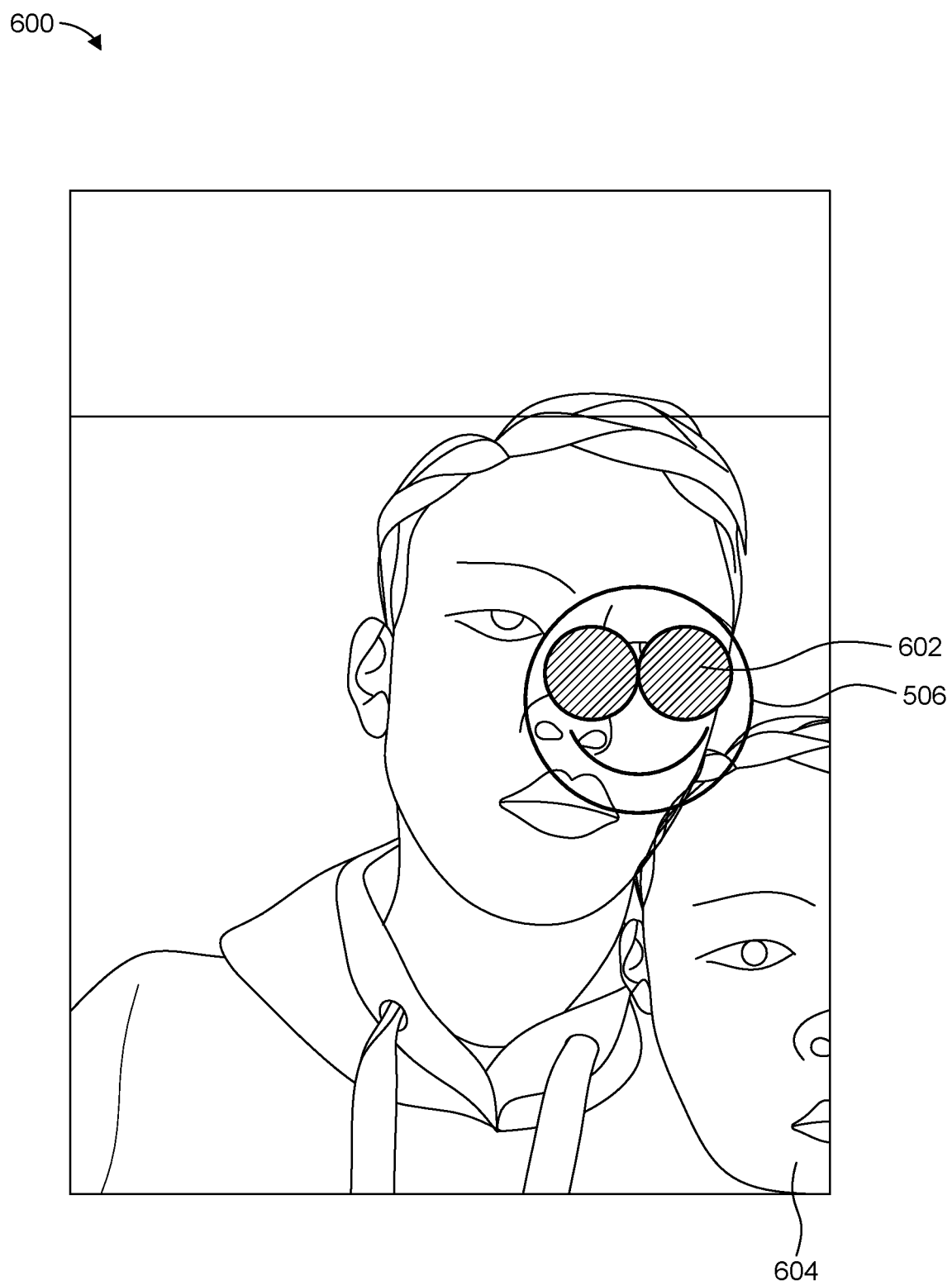
FIG. 6 shows another example user interface of a content distribution application in accordance with the present disclosure.

FIG. 6 illustrates an example UI 600 depicting the user attempting to align a detected face 502 and/or the image overlay 504 with the target image 506. The user may attempt to align the detected face 502 and/or the image overlay 504 with the target image at predetermined times and/or at times that correspond to a predetermined rhythm or a beat of the piece of music. As discussed above, an object tracking model (e.g. object tracking and detection model 110) may be utilized to determine whether the detected face 502 and/or the image overlay 504 aligns or approximately aligns with the target image 506. The detected face 502 and/or the image overlay 504 may align with the target image 506 when the detected face 502 and/or the image overlay 504 and the target image 506 completely overlap (e.g. are in the same location on the camera feed). The detected face 502 and/or the image overlay 504 and the target image 506 may approximately align when the detected face 502 and/or the image overlay 504 and the target image 506 partially, or almost completely (e.g. within a predetermined distance threshold), overlap.

A video segmentation model, such as the video segmentation model 109 described above, may be configured to capture one or more images of the detected face 502 when the detected face 502 aligns or approximately aligns with the target image 506. For example, the video segmentation model may be configured to capture one or more images of the detected face 502 when the detected face 502 aligns or approximately aligns with the target image 506, regardless of whether the alignment occurs on the beat of the selected piece of music.

At 412, an image of the face may be generated and/or captured. For example, the video segmentation model may be configured to segment the series of video frames (i.e. the series of images), into multiple regions to determine information about the detected face 502. The information about the detected face 502 may be used to determine the boundaries and/or outline of the detected face 502. The information about the detected face 502 may be used to differentiate the detected face 502 from other objects in the series of frames. For example, the information the detected face 502 may be used by the video segmentation model to differentiate the detected face 502 from other body parts, such as a neck or chest, in the series of frames. Once the detected face 502 has been differentiated, the video segmentation model may separate the detected face 502 from the remainder of the frame(s). Once separated from the remainder of the frame(s), the detected face 502 may be saved as an image.

An animated overlay of the image of the detected face 502 may be configured to move across the camera feed while the short video is still being recorded. For example, FIG. 6 depicts an animated overlay 604 of an image of the detected face 502 moving across the camera feed while the short video is still being recorded. The animated overlay 604 may be configured to move across the camera feed in any direction, such as towards the target image 506. The animated overlay 604 may move across the camera feed at any speed. One or more animated overlays 604 may move across the camera feed at any one time. During the duration of the short video creation, a plurality of animated overlays 604 may move across the camera feed.

The animated overlay 604 may be configured to move across the camera feed so that it reaches the target image 506 at pre-determined times, such as at times that correspond to the beat of the selected music piece. For example, a beat tracking model, such as the beat tracking model 111 described above, may keep track of the times (e.g. the timestamps) during the selected music piece that correspond to the beat and/or rhythm of that music piece. The location(s) of the target image 506 may be known. The timestamps associated with the beat of the music sample and the location(s) of the target image 506 may be used, in combination, to determine when the animated overlay 604 should begin moving across the camera feed so that the animated overlay 604 reaches the location of the target image 506 at the desired time (e.g. on beat).

In an embodiment, the beat tracking model may be utilized to determine whether the detected face 502 aligns or approximately aligns with the target image 506 at a time proximate to a beat of the selected piece of music. The beat tracking model may keep track of timestamps that are indicative of one or more times corresponding to the beat and/or rhythm of the selected piece of music. The beat tracking model may also keep track of and/or generate timestamps that are indicative of one or more times at which the detected face 502 aligns or approximately aligns with the target image 506 (as determined by the object detection and tracking model). The beat tracking model may compare the timestamps indicative of the time(s) at which the detected face 502 aligns or approximately aligns with the target image 506 with the timestamps corresponding to the beat and/or rhythm of the selected piece of music to determine whether the alignment occurs at a time proximate to a beat of the selected piece of music.

At 414, it may be determined whether the detected face 502 and/or the image overlay 504 align with the target image 506 on beat. For example, the beat tracking model may be utilized to determine whether the detected face 502 and/or the image overlay 504 align with the target image 506 on beat or approximately on beat of the selected piece of music.

As discussed above, feedback image overlays may be output during creation of the short video. The feedback image overlays may be indicative of whether the detected face 502 and/or the image overlay 504 aligned or approximately aligned with the target image 506 at a time proximate to a beat and/or rhythm of the selected piece of music. For example, the feedback image overlays may be indicative of whether the beat tracking model determined that the detected face 502 and/or the image overlay 504 was aligned or approximately aligned with the target image at a time proximate to a beat of the selected piece of music. The feedback image overlays may indicate whether the detected face 502 and/or the image overlay 504 was aligned with the target image 506 on the beat of the selected piece of music, almost aligned with the target image on the beat of the selected piece of music (e.g. almost on beat or within a predetermined time of the beat), or not aligned with the target image on the beat of the selected piece of music (e.g. not on beat or not within a predetermined time of the beat). The feedback image overlays may be different depending on whether the detected face 502 and/or the image overlay 504 was aligned with the target image 506 on beat, almost on beat, or not on beat.

If it is determined that the detected face 502 and/or the image overlay 504 align with the target image 506 almost on beat, an almost-on beat feedback image may be output. For example, the UI 600 illustrates an exemplary type of feedback image 602. The feedback image 602 may indicate that the detected face 502 and/or the image overlay 504 was aligned or approximately aligned with the target image 506 almost on beat. The feedback image 602 may be overlaid on the target image 506. For example, the feedback image 602 (e.g. blue or green circles) may be overlaid on the "eyes" of the smiley face target image 506. In another embodiment, the feedback image 602 may additionally, or alternatively, be overlaid on the detected face 502 and/or the image overlay 504. While depicted as circles in FIG. 6, the feedback image 602 may be any size, color, and/or shape.

Figure 7:
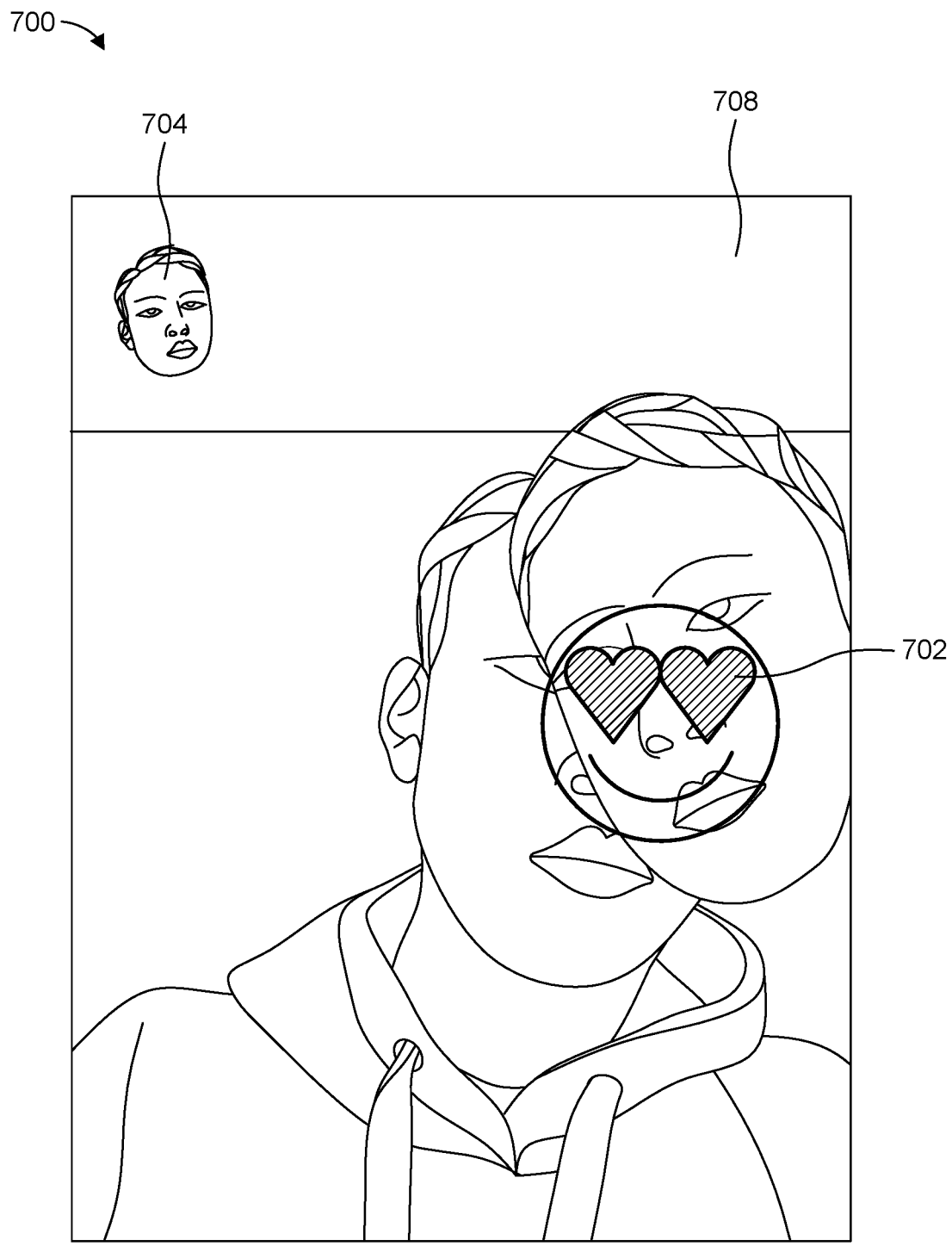
FIG. 7 shows another example user interface of a content distribution application in accordance with the present disclosure.

A different type of feedback image overlay may instead be output if the detected face 502 and/or the image overlay 504 aligns or approximately aligns with the target image 506 on the beat of the selected piece of music. If it is determined that the detected face 502 and/or the image overlay 504 and the target image 506 align on beat, the method 400 may proceed to 418. At 418, output of an on-beat feedback may be caused. For example, FIG. 7 depicts a feedback image 702. The feedback image 702 may indicate that the detected face 502 and/or the image overlay 504 was aligned or approximately aligned with the target image 506 on beat. The feedback image 702 may be overlaid on the target image 506. For example, the feedback image 702 (e.g. hearts) may be overlaid on the "eyes" of the smiley face target image 506. In another embodiment, the feedback image 702 may additionally, or alternatively, be overlaid on the detected face 502 and/or the image overlay 504. While depicted as hearts in FIG. 7, the feedback image 702 may be any size, color, and/or shape.

If the detected face 502 and/or the image overlay 504 aligns or approximately aligns with the target image 506 on the beat of the selected piece of music, an image of the detected face 502 may be displayed in a top bar 708 of the video creation feed. At 420, an image of the face may be displayed in a top bar of the camera feed. The image of the detected face 502 displayed in the top bar 708 may be generated/captured by the video segmentation model at the time or proximate the time when the detected face 502 and/or the image overlay 504 aligns or approximately aligns with the target image 506 (e.g. on the beat).

The user may be aware that the video segmentation model is configured to capture an image of the detected face 502 for display in the top bar 708 when the detected face 502 and/or the image overlay 504 aligns or approximately aligns with the target image 506 on the beat of the selected piece of music. As a result, the user may attempt to contort and/or control his or her face in a particular way so that the captured images of the detected face 502 are entertaining or interesting. For example, the user may attempt to make a funny face. As a result, the captured images that are output in the top bar 708 may be entertaining. This may increase the likelihood that other users who watch the short video will find it to be entertaining.

Figure 8:
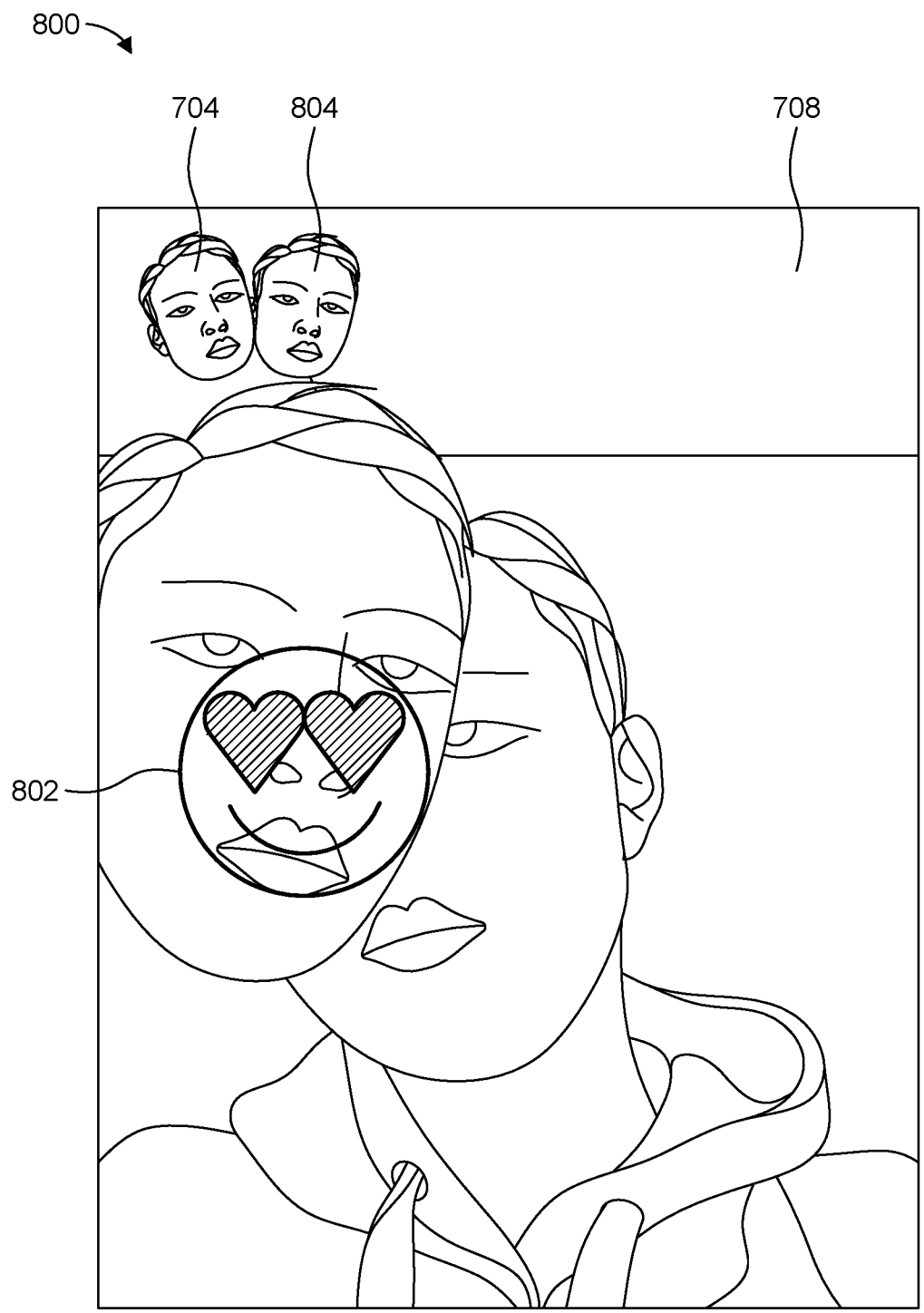
FIG. 8 shows another example user interface of a content distribution application in accordance with the present disclosure.

After the user aligns or approximately aligns the detected face 502 and/or the image overlay 504 with the target image 506, a new target image may appear. For example, FIG. 8 illustrates a UI 800 depicting the user attempting to align the detected face 502 and/or the image overlay 504 with a new target image 802. Again, a certain type of feedback image may be output depending on whether the detected face 502 and/or the image overlay 504 and the new target image 802 align or approximately align on beat. Each time the detected face 502 and/or the image overlay 504 aligns or approximately aligns with a target image, such as the target image 802, on the beat of the selected piece of music, an additional image of the detected face 502 may be displayed in the top bar 708 of the video creation feed. For example, an additional image 804 of the detected face 502 may be generated/captured by the video segmentation model at the time or proximate the time when the detected face 502 and/or the image overlay 504 aligns or approximately aligns with a target image, such as the target image 802 (e.g. on the beat). The additional image 804 may be displayed in the top bar 708 along with the image 704 that was previously captured.

Figure 9:
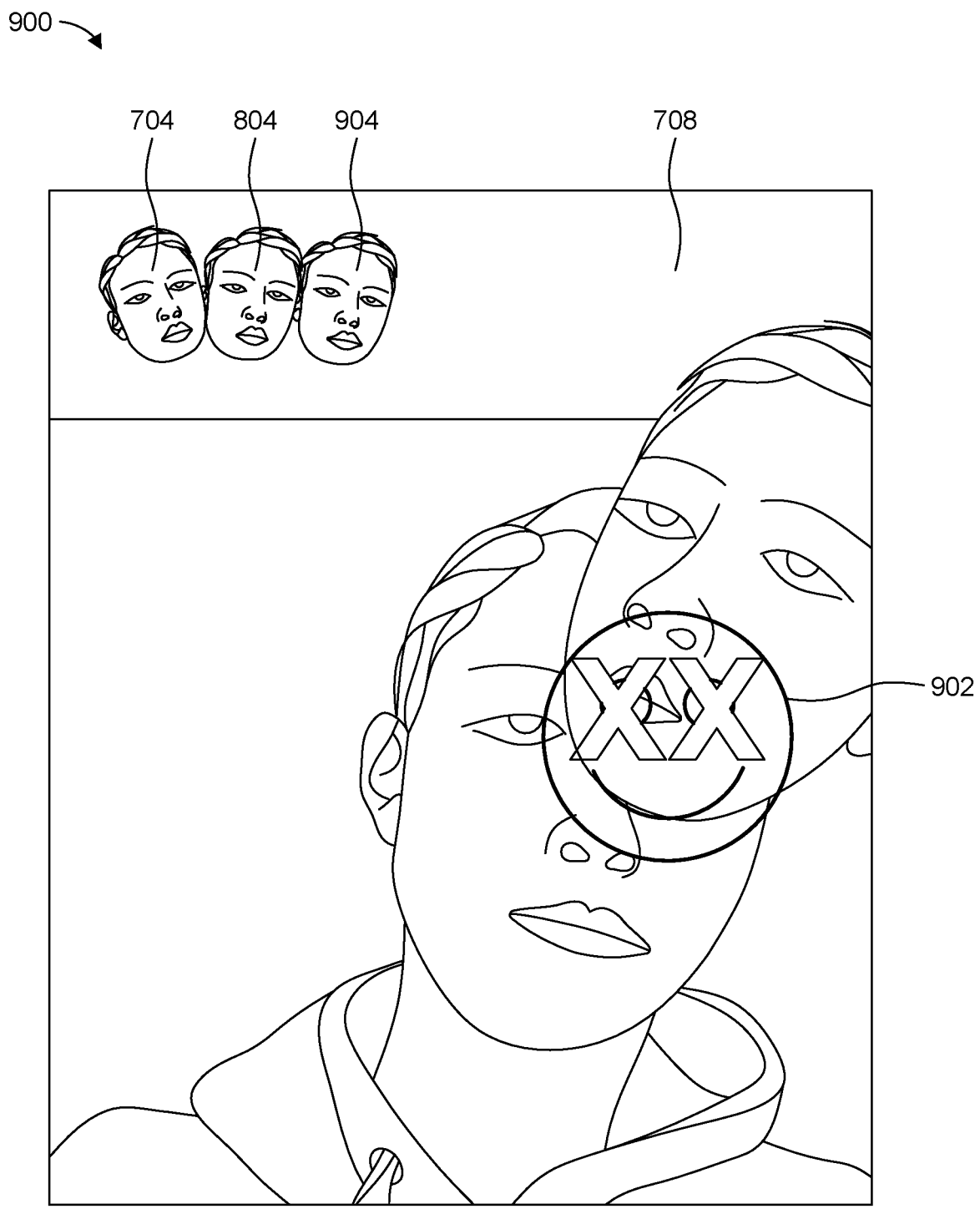
FIG. 9 shows another example user interface of a content distribution application in accordance with the present disclosure.

Referring back to FIG. 4, if it is determined that the detected face 502 and/or the image overlay 504 and the target image 506 do not align on beat, the method 400 may proceed to 416. At 416, output of an off-beat feedback may be caused. For example, FIG. 9 depicts a UI 900 illustrating a feedback image 902. The feedback image 902 may indicate that the detected face 502 and/or the image overlay 504 was not aligned or approximately aligned with the target image 506 on beat. The feedback image 902 may be overlaid on the target image 506. For example, the feedback image 902 (e.g. x-marks or crosses) may be overlaid on the "eyes" of the smiley face target image 506. In another embodiment, the feedback image 902 may additionally, or alternatively, be overlaid on the detected face 502 and/or the image overlay 504. While depicted as x-marks or crosses in FIG. 9, the feedback image 902 may be any size, color, and/or shape. After the user attempts, but fails, to align or approximately align the detected face 502 and/or the image overlay 504 with the target image 506 on beat, a new target image may appear. The user may again attempt to align the detected face 502 and/or the image overlay 504 and the new target image on beat.

The above described process of outputting a target image, determining whether the detected face 502 and/or the image overlay 504 align with the target image on beat, outputting feedback images, capturing images of the detected face 502, and outputting a new target and/or an animated overlay of the captured image(s) may be continued for the duration of the short video. The short video may continue, for example, until the user has aligned the detected face 502 and/or the image overlay 504 align with a target image on beat a predetermined number of times. For example, the goal may be seven times. When the user has aligned the detected face 502 and/or the image overlay 504 align with a target image on beat seven times, recording of the short video may be terminated. Additionally, or alternatively, creation of the short video may be terminated after a predetermined period of time. For example, creation of the short video may be terminated after a predetermined period of time regardless of how many times the user has aligned the detected face 502 and/or the image overlay 504 with a target image on beat. The predetermined period of time may be any period of time, such as 30 seconds or one minute.

At 422, it may be determined whether an image threshold and/or a time threshold is satisfied. The image threshold may be indicative of the predetermined number of times that the user attempts to align the detected face 502 and/or the image overlay 504 with a target image on beat. For example, the image threshold may be satisfied if the user has aligned the detected face 502 and/or the image overlay 504 align with a target image on beat the predetermined number of times, such as seven times. The time threshold may be any predetermined period of time, such as 30-seconds or one minute. The time threshold may be satisfied if the predetermined period of time has elapsed, regardless of how many times the user has aligned the detected face 502 and/or the image overlay 504 with a target image on beat. If it is determined that neither the image threshold and/or the time threshold is satisfied, the method 400 may proceed back to 412. Conversely, if it is determined that either the image threshold and/or the time threshold is satisfied, the method 400 may proceed to 424. At 424, output and rotation of all captured images displayed in the top bar 708 may be caused. For example, the images of the detected 502 displayed in the top bar 708, including the images 704, 804, and 904, may be configured to move down from the top bar 708 and rotate around the detected face 502. At 426, termination of recording may be caused. After the short video has been created (e.g. recorded), it may be uploaded to the short video service for viewing by other users of the short video service.

Figure 10:
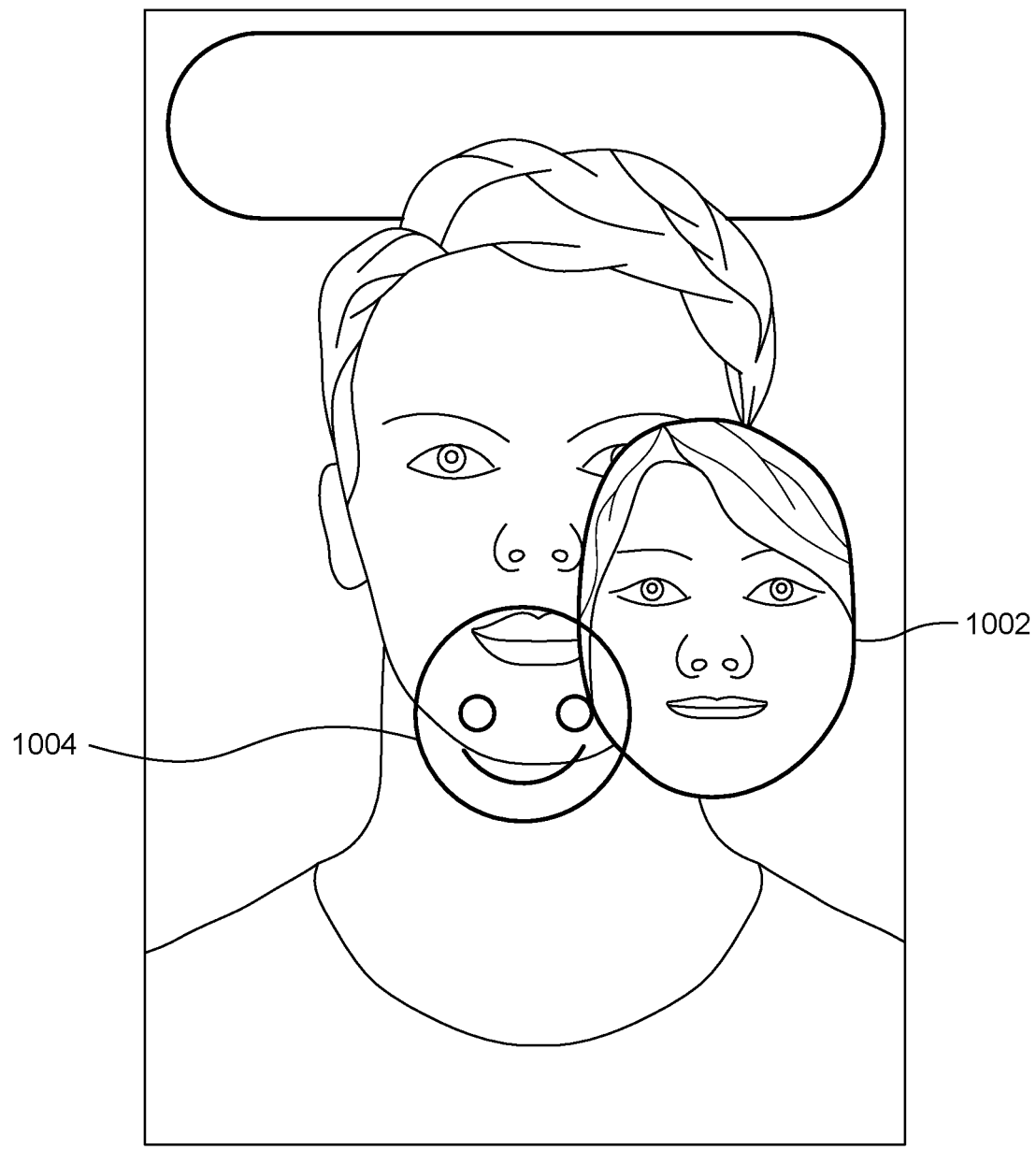
FIG. 10 shows another example user interface of a content distribution application in accordance with the present disclosure.

As discussed above, the animated overlay(s) that move across the camera feed during creation of a short video may include images of a body part belonging to one or more users other than the user creating the short video. FIG. 10 illustrates a UI 1000 depicting an animated overlay 1002 including an image of a part of a different user than the user creating the short video. For example, the animated overlay 1002 may include an image of the different user's head or face. The different user may be a friend, family member, or a complete stranger. For example, the different user may be a user of the short video service 112 that has previously created a short video in the manner described above. When the different user previously created a short video in the manner described above, that user's body part(s), such as his or her face, may have been segmented and saved as an image. This image may be utilized by one or more subsequent creators of short videos.

Figure 11:
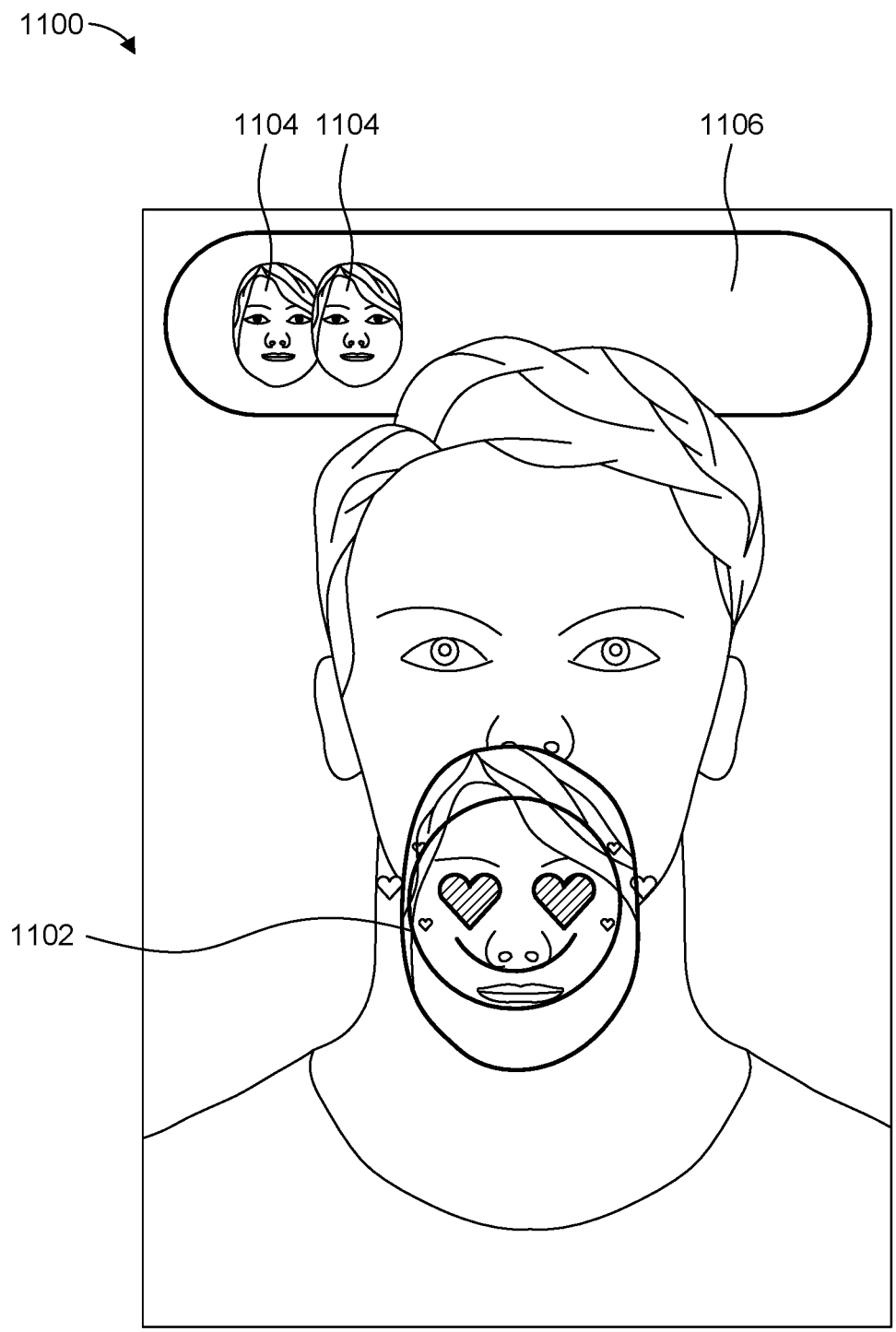
FIG. 11 shows another example user interface of a content distribution application in accordance with the present disclosure.

The animated overlay 1002 of the other user's body part(s) may be configured to move across the camera feed while the user attempts to align the user's own body part(s) with one or more target images, such as the target image 1004. FIG. 11 illustrates an example UI 1111 depicting a user attempting to align the user's own body part(s) with the target image 1004 while the animated overlay 1002 of the other user's body part(s) moves across the camera feed. The animated overlay 1002 of the other user's body part(s) may be configured to move across the camera feed in any direction, such as towards the target image 1004. The animated overlay 1002 of the other user's body part(s) may move across the camera feed at any speed. One or more animated overlay(s) of the other user's body part(s) may move across the camera feed at any one time.

If the user aligns or approximately aligns the user's own body part(s) with the target image 1004 on beat to a selected piece of music, one or more of the images used in the animated overlays 1002 of the other user's body part(s) may displayed in a top bar 1106 of the video creation feed. For example, if the animated overlay 1002 of the other user's body part(s) is configured to move across the camera feed towards the target image 1004, the target image 1004, the user's body part(s), and the animated overlay 1002 may all be aligned or approximately aligned on beat. Each time this occurs, the image used in that particular animated overlay of the other user's body part(s) may be moved to the top bar 1106. During creation of the short video, a plurality of images 1104 of the other user's body part(s) may be moved to the top bar 1106.

Figure 12:
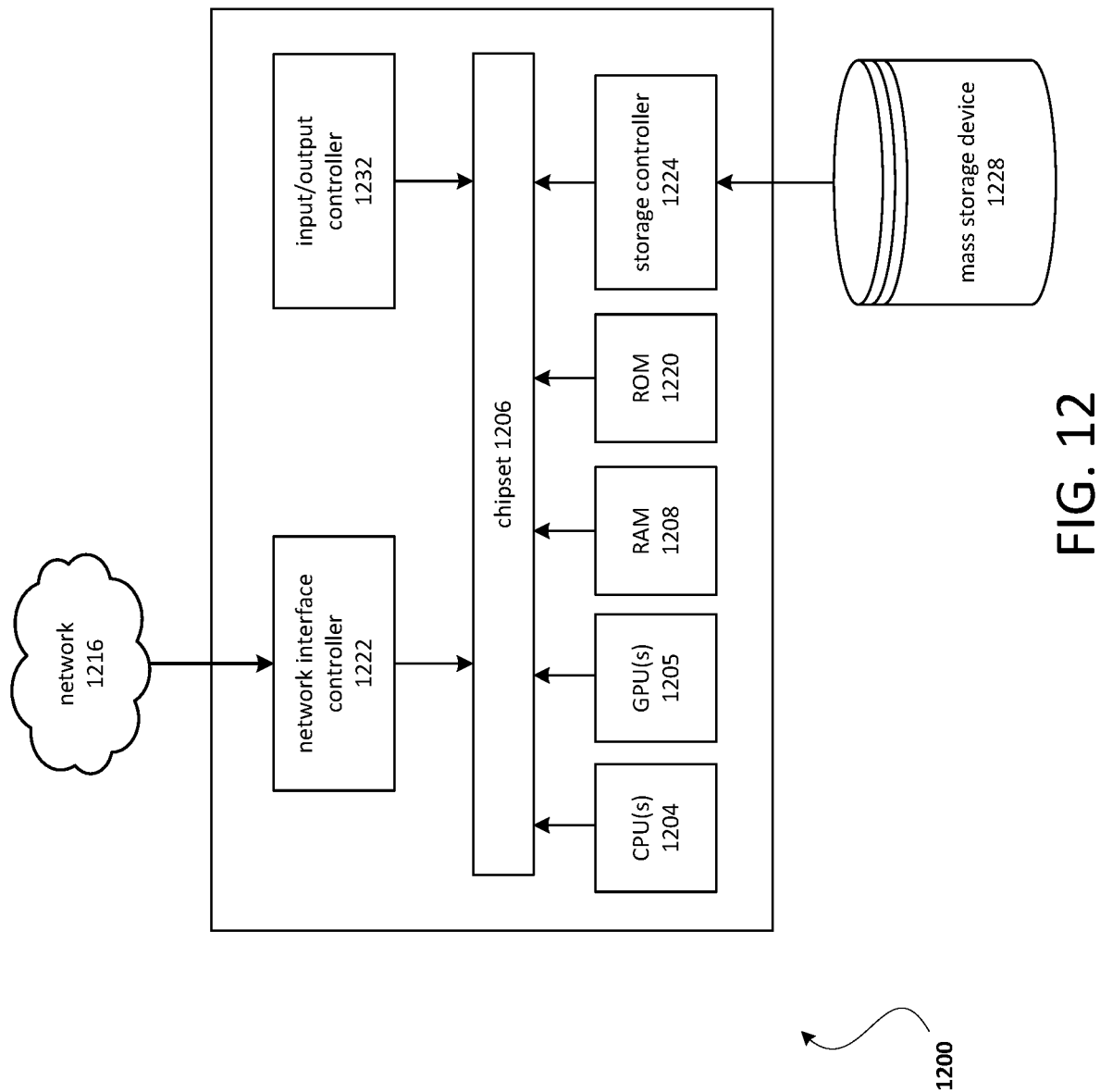
FIG. 12 shows an example computing device which may be used to perform any of the techniques disclosed herein.

FIG. 12 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s). The GPU(s) may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A computer-implemented method for creating content, the method comprising:

acquiring a plurality of images comprising an object, the object being a human body and comprising at least one part of the human body having movements in the plurality of images;

determining whether at least one portion of the at least one part of the human body in a first image aligns with a target image overlaid on the first image and whether the at least one portion aligns with the target image at a time proximate to a first rhythmic point of a playback of a selected piece of music, wherein the at least one portion of the at least one part of the human body and the target image are simultaneously displayed on a same interface;

segmenting the at least one part of the human body or the at least one portion of the at least one part of the human body from the first image in response to determining that the at least one portion aligns with the target image at the time proximate to the first rhythmic point of the playback of the selected piece of music;

generating a first overlay, the first overlay comprising the segmented at least one part of the human body or the segmented at least one portion of the at least one part of the human body;

generating an animation of the first overlay configured to enable the first overlay to move relative to at least a portion of the plurality of images before the first overlay is positioned in a predetermined area of the same interface;

displaying the first overlay at a first location in the predetermined area of the same interface;

generating a second overlay, the second overlay comprising at least one part of the object or at least one portion of the at least one part of the object segmented from a second image; and positioning the second overlay at a second location in the predetermined area of the same interface, wherein the second location of the second overlay is different from the first location of the first overlay.

2. The computer-implemented method of claim 1, further comprising:

determining whether the at least one portion of the at least one part of the object in the second image aligns with the target image overlaid on the second image and whether the at least one portion aligns with the target image at a time proximate to a second rhythmic point of the playback of the selected piece of music; and segmenting the at least one part of the object or the at least one portion of the at least one part of the object from the second image in response to determining that the at least one portion aligns with the target image at the time proximate to the second rhythmic point of the playback of the selected piece of music.

3. The computer-implemented method of claim 1, further comprising:

detecting the at least one part of the object in the plurality of the images.

4. The computer-implemented method of claim 3, further comprising:

comparing coordinates of the target image with coordinates of the at least one portion of the at least one part of the object in the plurality of images.

5. The computer-implemented method of claim 3, further comprising:

overlaying an image on the at least one portion of the at least one part of the object; and determining whether the image overlaid on the at least one portion aligns with the target image.

6. A system, comprising:

at least one computing device in communication with a computer memory, the computer memory comprising computer-readable instructions that upon execution by the at least one computing device, configure the system to perform operations comprising:

acquiring a plurality of images comprising an object, the object being a human body and comprising at least one part of the human body having movements in the plurality of images;

determining whether at least one portion of the at least one part of the human body in a first image aligns with a target image overlaid on the first image and whether the at least one portion aligns with the target image at a time proximate to a first rhythmic point of a playback of a selected piece of music, wherein the at least one portion of the at least one part of the human body and the target image are simultaneously displayed on a same interface;

segmenting the at least one part of the human body or the at least one portion of the at least one part of the human body from the first image in response to determining that the at least one portion aligns with the target image at the time proximate to the first rhythmic point of the playback of the selected piece of music;

generating a first overlay, the first overlay comprising the segmented at least one part of the human body or the segmented at least one portion of the at least one part of the human body;

generating an animation of the first overlay configured to enable the first overlay to move relative to at least a portion of the plurality of images before the first overlay is positioned in a predetermined area of the same interface;

displaying the first overlay at a first location in the predetermined area of the same interface;

generating a second overlay, the second overlay comprising at least one part of the object or at least one portion of the at least one part of the object segmented from a second image; and positioning the second overlay at a second location in the predetermined area of the same interface, wherein the second location of the second overlay is different from the first location of the first overlay.

7. The system of claim 6, further comprising:
determining whether the at least one portion of the at least one part of the object in the second image aligns with the target image overlaid on the second image and whether the at least one portion aligns with the target image at a time proximate to a second rhythmic point of the playback of the selected piece of music; and
segmenting the at least one part of the object or the at least one portion of the at least one part of the object from the second image in response to determining that the at least one portion aligns with the target image at the time proximate to the second rhythmic point of the playback of the selected piece of music.

8. The system of claim 6, the operations further comprising:
detecting the at least one part of the object in the plurality of the images.

9. The system of claim 8, the operations further comprising:
comparing coordinates of the target image with coordinates of the at least one portion of the at least one part of the object in the plurality of images.

10. The system of claim 6, the operations further comprising:
generating and displaying a feedback image indicating whether the at least one portion of the at least one part of the object aligns with the target image at the time proximate to the first rhythmic point of the playback of the piece of music.

11. The system of claim 6, the operations further comprising:
overlaying an image over the at least one portion of the at least one part of the object.

12. The system of claim 6, the operations further comprising:
determining that an overlay on the at least one portion of the at least one part of the object aligns with the target image.

13. A non-transitory computer-readable storage medium, storing computer-readable instructions that upon execution by a processor cause the processor to implement operations comprising:
acquiring a plurality of images comprising an object, the object being a human body and comprising at least one part of the human body having movements in the plurality of images;
determining whether at least one portion of the at least one part of the human body in a first image aligns with a target image overlaid on the first image and whether the at least one portion aligns with the target image at a time proximate to a first rhythmic point of a playback of a selected piece of music, wherein the at least one portion of the at least one part of the human body and the target image are simultaneously displayed on a same interface;
segmenting the at least one part of the human body or the at least one portion of the at least one part of the human body from the first image in response to determining that the at least one portion aligns with the target image at the time proximate to the first rhythmic point of the playback of the selected piece of music;
generating a first overlay, the first overlay comprising the segmented at least one part of the human body or the segmented at least one portion of the at least one part of the human body;
generating an animation of the first overlay configured to enable the first overlay to move relative to at least a portion of the plurality of images before the first overlay is positioned in a predetermined area of the same interface;
displaying the first overlay at a first location in the predetermined area of the same interface;
generating a second overlay, the second overlay comprising at least one part of the object or at least one portion of the at least one part of the object segmented from a second image; and
positioning the second overlay at a second location in the predetermined area of the same interface, wherein the second location of the second overlay is different from the first location of the first overlay.

14. The non-transitory computer-readable storage medium of claim 13, the operations further comprising:
comparing coordinates of the target image with coordinates of the at least one portion of the at least one part of the object in the plurality of images.

15. The non-transitory computer-readable storage medium of claim 13, the operations further comprising:
overlaying an image over the at least one portion of the at least one part of the object; and
determining whether the image overlaid on the at least one portion aligns with the target image.

16. The non-transitory computer-readable storage medium of claim 13, the operations further comprising:
generating and displaying a feedback image indicating whether the at least one portion of the at least one part of the object aligns with the target image at the time proximate to the first rhythmic point of the playback of the piece of music.

* * * * *